United States Patent [19]

Luaces

[11] 4,275,024
[45] Jun. 23, 1981

[54] PROCESS AND APPARATUS FOR ELIMINATION OF DENSIFIED AREAS IN BLOCKS OF PLIABLE POLYURETHANE FOAM

[75] Inventor: Roman Y. Luaces, Pontevedra, Spain

[73] Assignee: TEC Foam S.A., Vigo, Spain

[21] Appl. No.: 66,839

[22] Filed: Aug. 15, 1979

Related U.S. Application Data

[63] Continuation-in-part of Ser. No. 945,893, Sep. 26, 1978, abandoned, which is a continuation-in-part of Ser. No. 777,840, Mar. 15, 1977, abandoned.

[30] Foreign Application Priority Data

| May 24, 1976 | [ES] | Spain | 448190 |
| Jan. 18, 1978 | [ES] | Spain | 466102 |
| Feb. 14, 1978 | [ES] | Spain | 466951 |
| Sep. 28, 1978 | [ES] | Spain | 473730 |
| Nov. 29, 1978 | [ES] | Spain | 475522 |

[51] Int. Cl.³ .................................... B29D 27/04
[52] U.S. Cl. .................................... 264/51; 165/86; 264/40.6; 264/45.5; 264/216; 264/DIG. 84; 425/89; 425/144; 425/224; 425/817 C; 432/121
[58] Field of Search ................ 264/45.5, 54, 40.6.46.7, 264/51, DIG. 84, 216; 165/86; 432/121; 425/89, 224, 44, 817 C

[56] References Cited

U.S. PATENT DOCUMENTS

| 1,789,378 | 1/1931 | Comstock | 432/121 X |
| 2,235,476 | 3/1941 | Cook | 432/121 |
| 2,397,726 | 4/1946 | Cook | 432/121 X |
| 2,704,040 | 3/1955 | Warrington | 165/86 X |
| 2,853,400 | 9/1958 | Ahlbin | 264/54 X |
| 2,866,730 | 12/1958 | Potchen et al. | 264/54 X |
| 3,117,171 | 1/1964 | Voelker | 264/54 X |
| 3,124,627 | 3/1964 | Hood | 264/54 |
| 3,726,951 | 4/1973 | Smith et al. | 264/46.7 X |
| 3,907,951 | 9/1975 | Godley | 264/40.6 |
| 4,026,979 | 5/1977 | Palomares | 264/45.5 |

OTHER PUBLICATIONS

Knox, R. E. and R. H. Federroll, "Trouble-Shooting Guide for Molding One-Shot Resilient Polyether Foam", Wilmington, Del., E. I. Du Pont de Nemours, Inc.; Du Pont Aylene Foam Bulletin, Nov. 30, 1960, pp. 1-12.

*Primary Examiner*—Philip Anderson
*Attorney, Agent, or Firm*—Haseltine and Lake

[57] ABSTRACT

The densified area commonly formed during the manufacture of blocks of pliable polyurethane foam on a web of continuous material in a foaming tunnel is eliminated by controlled heating of the conveyor belt in the tunnel to a range between the densification temperature and the cracking temperature of the foam during the reaction period. An improved apparatus for this purpose comprises an enclosed, insulated housing and means for heating the conveyor belt such as hot air, infrared radiation, steam coils or electrical resistors. A preferred embodiment comprises heating the bottom of the foam block after it emerges from the foaming tunnel to a temperature considerably higher than that in the foaming tunnel. This eliminates completely any need for trimming off irregularities after removal of the web of continuous material.

23 Claims, 46 Drawing Figures

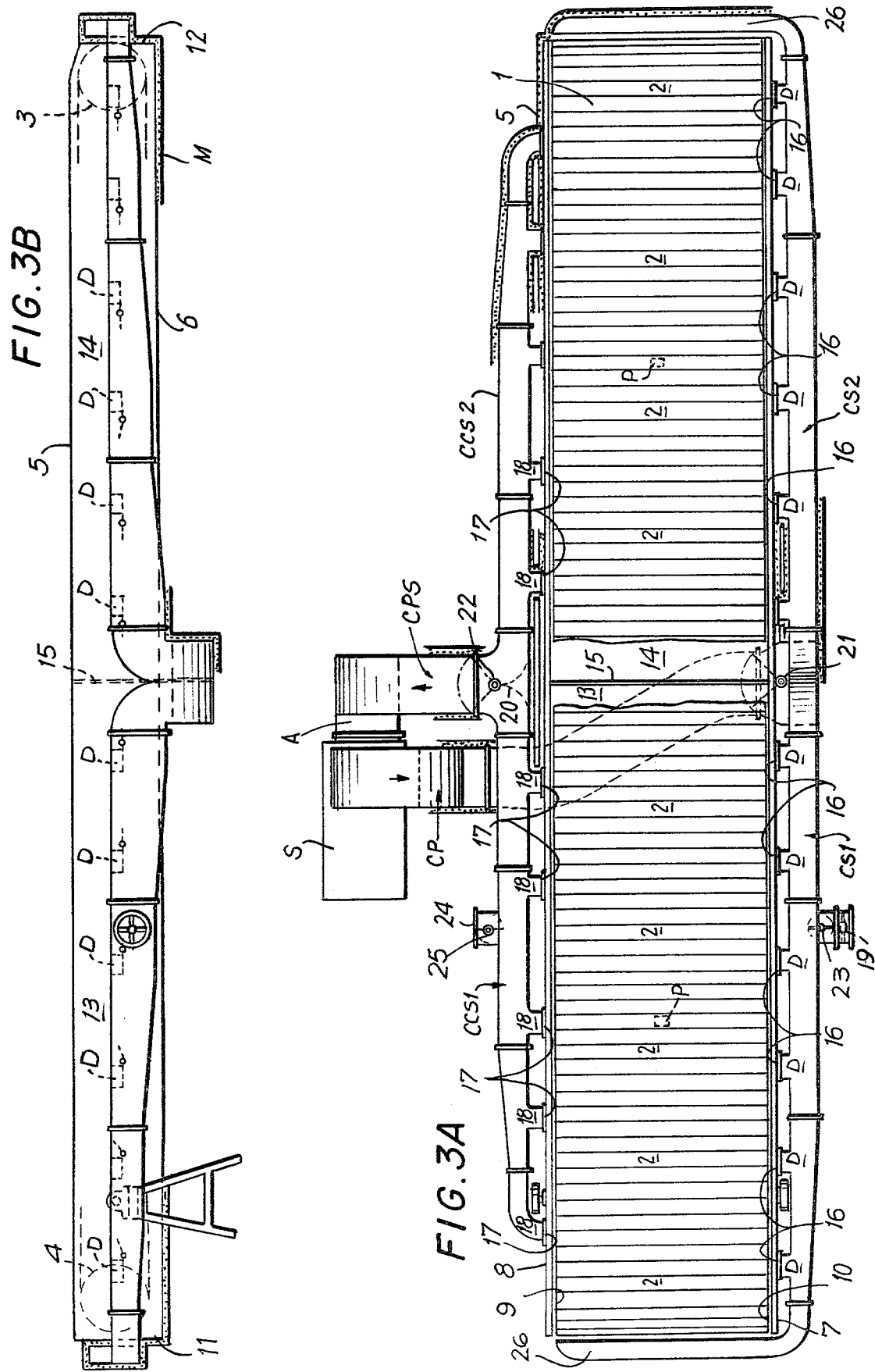

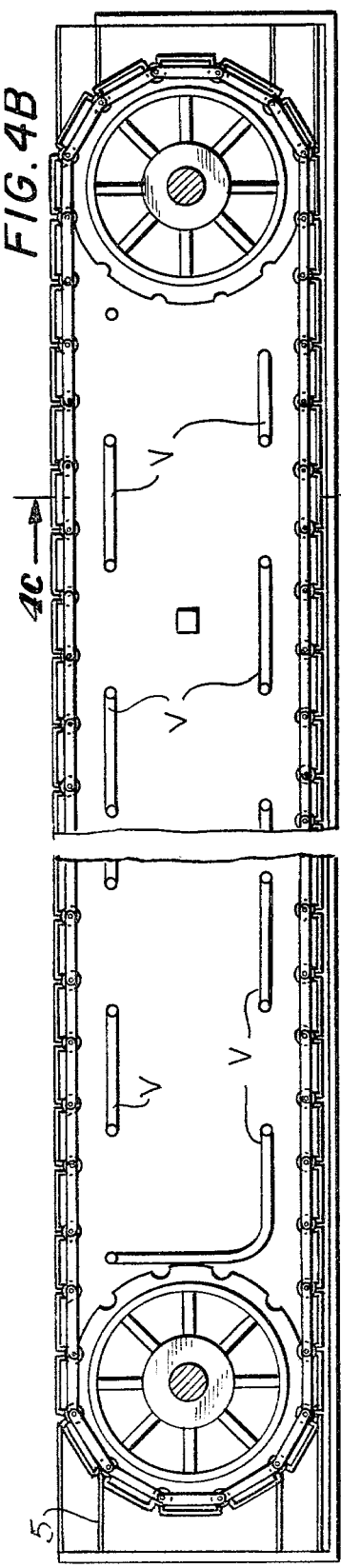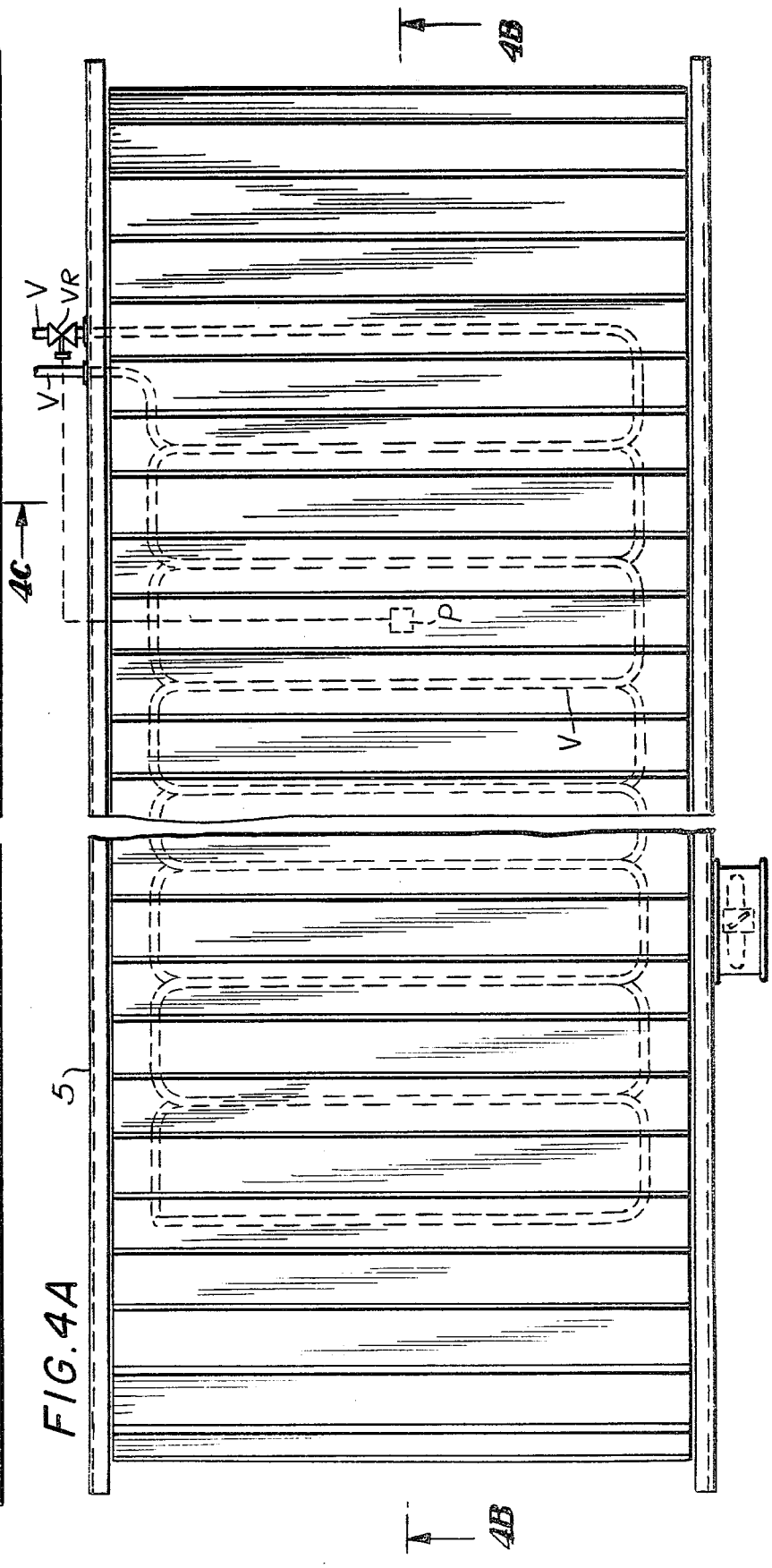

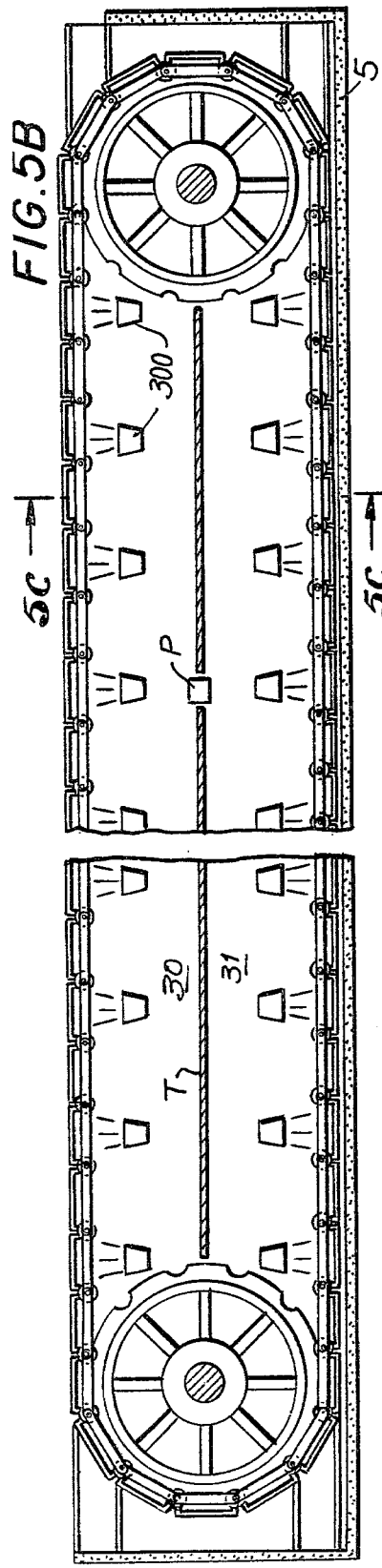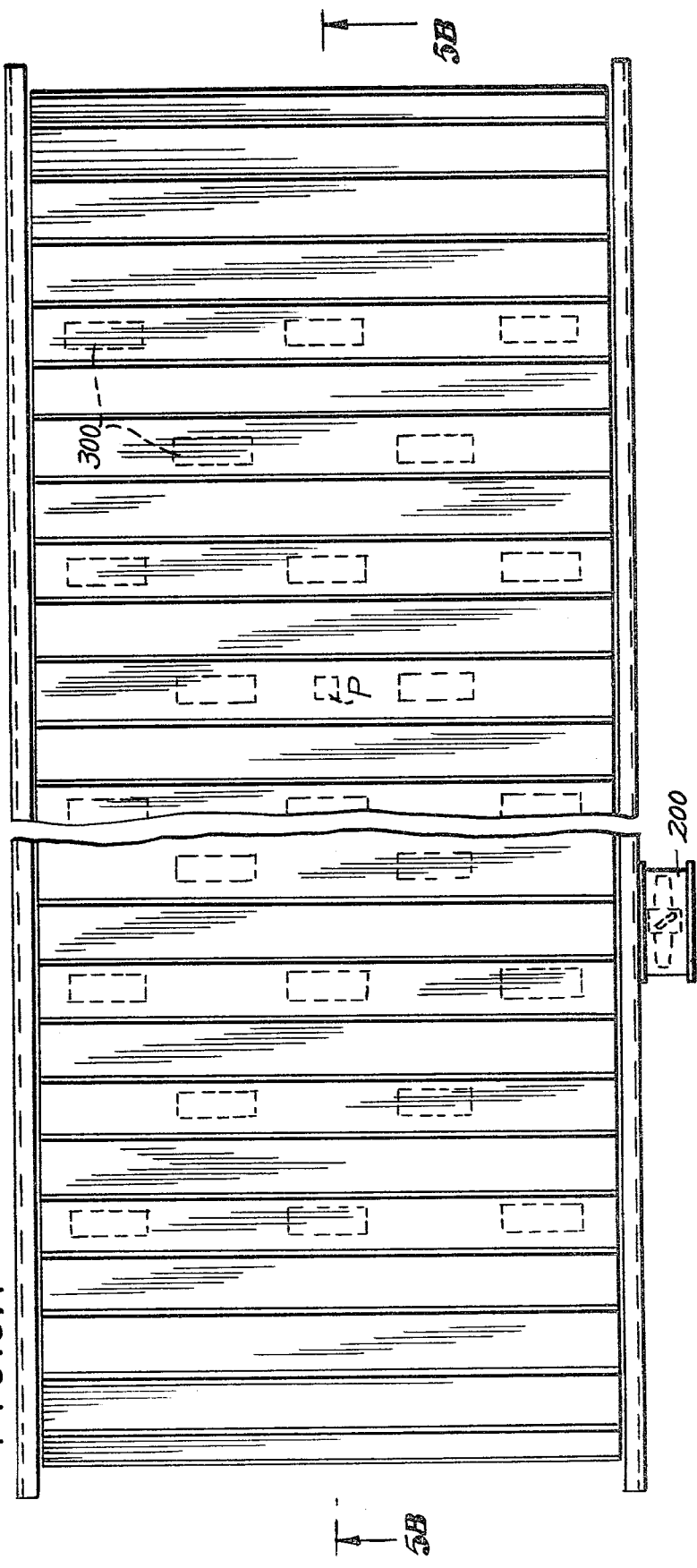

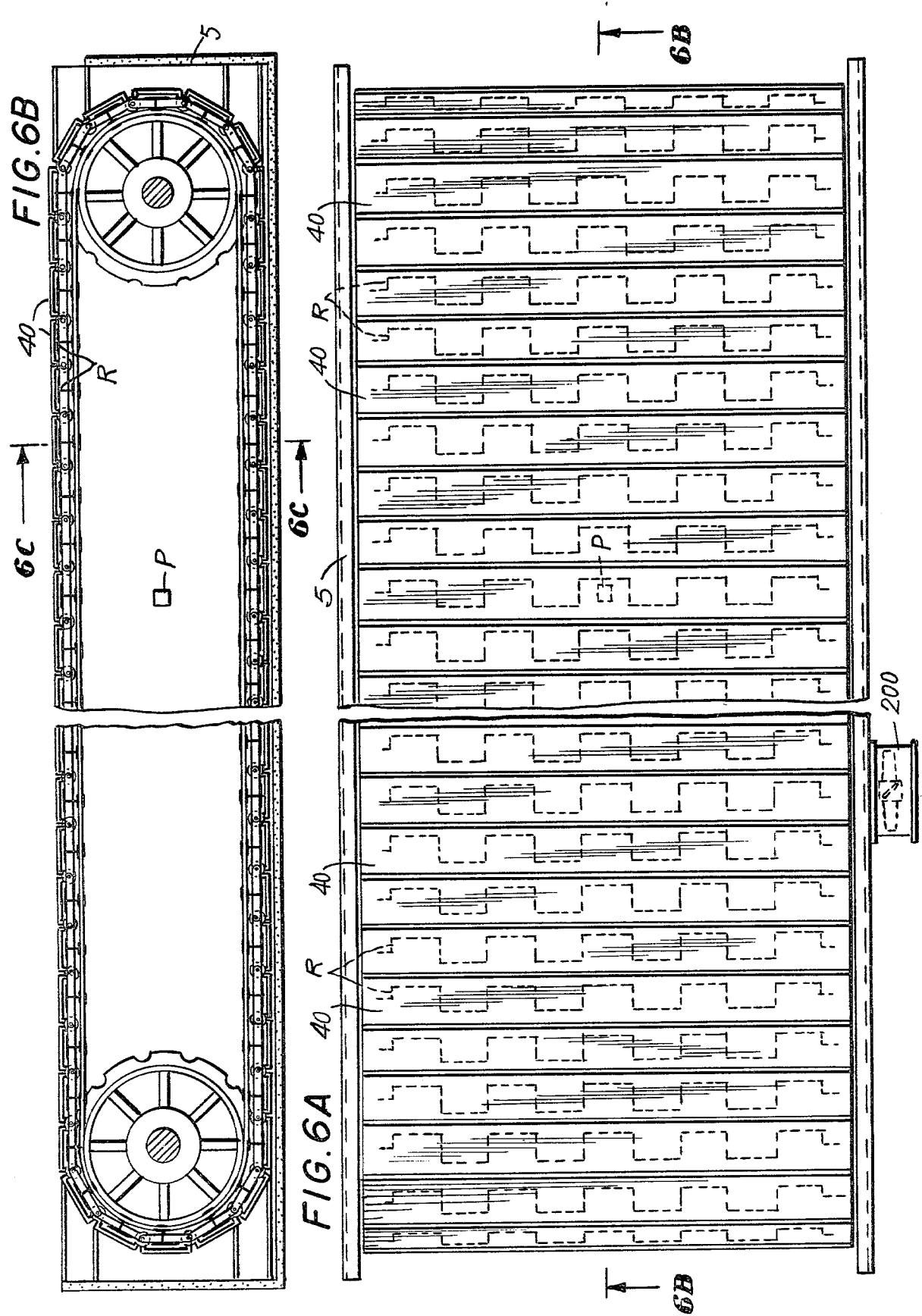

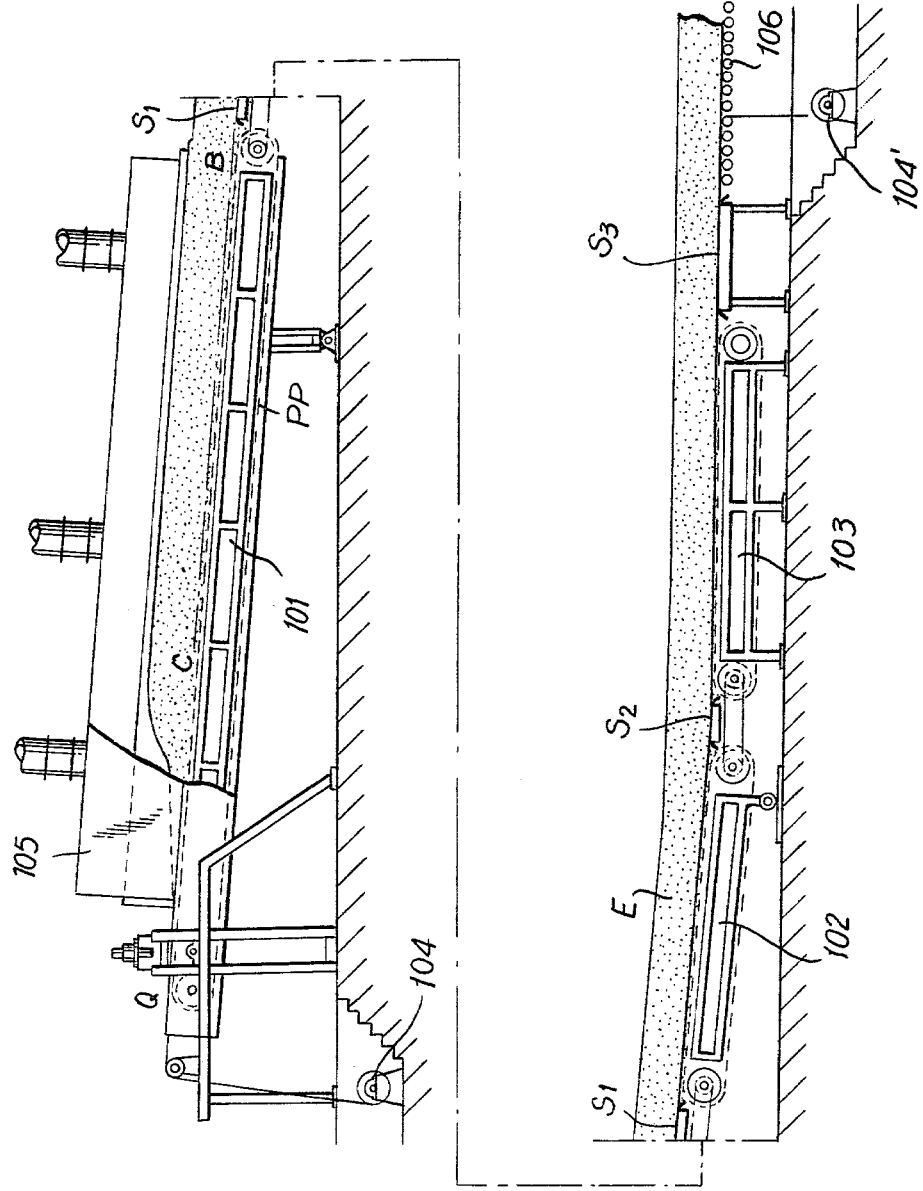

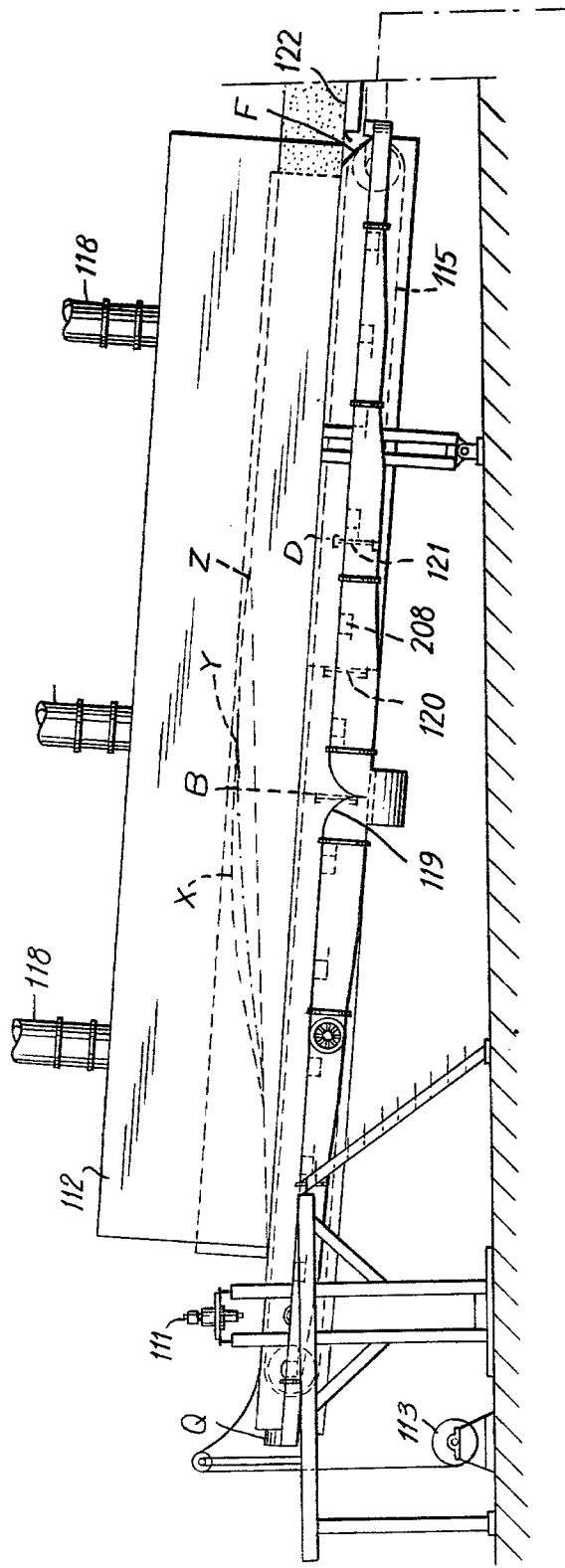
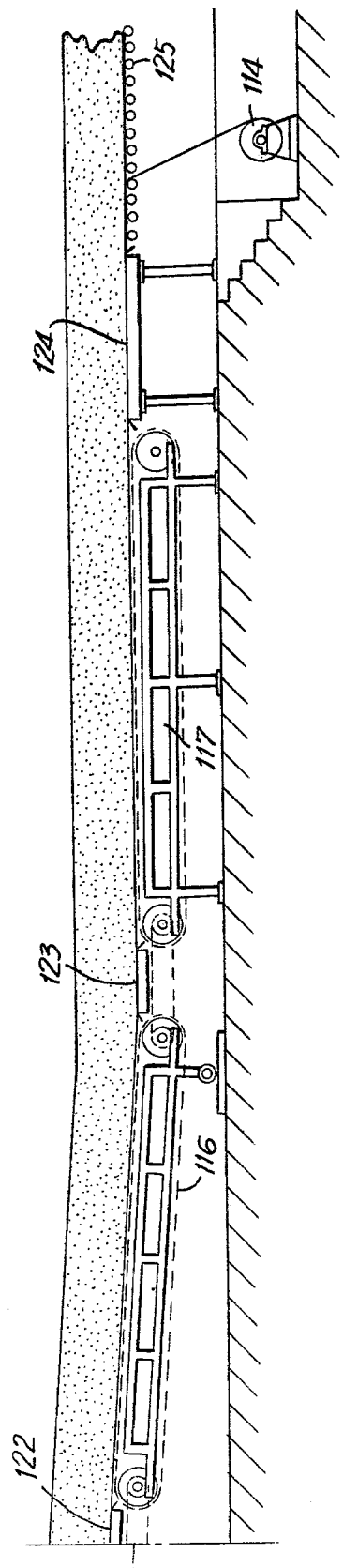
FIG. 9A

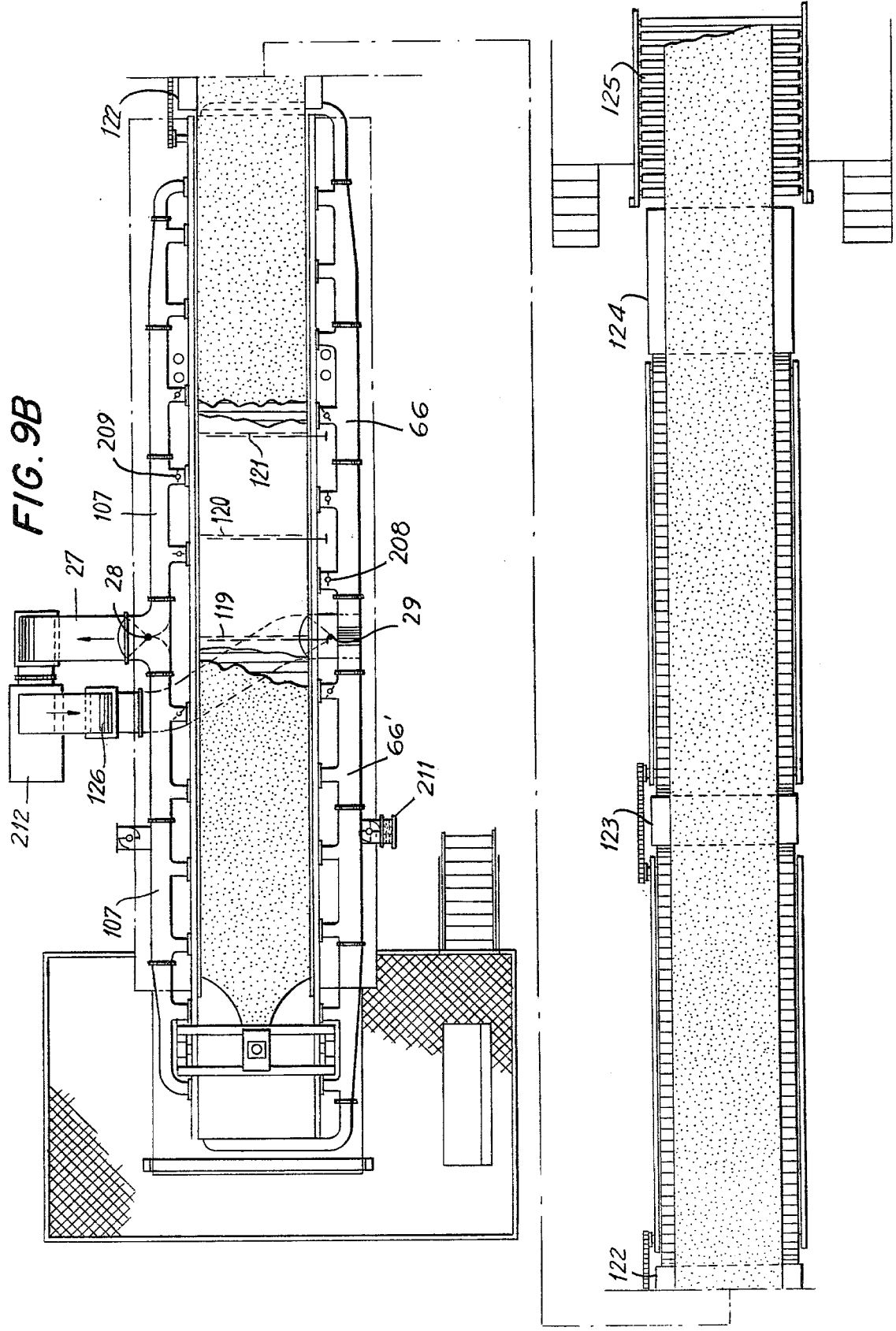

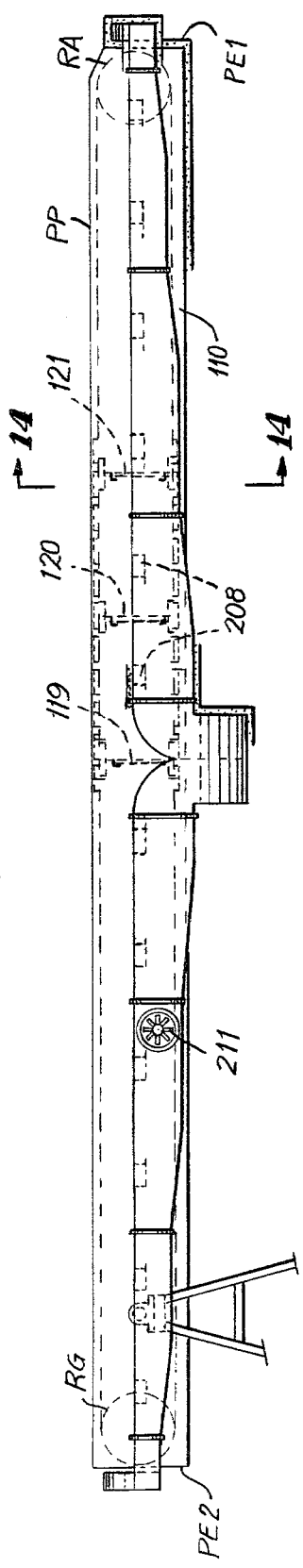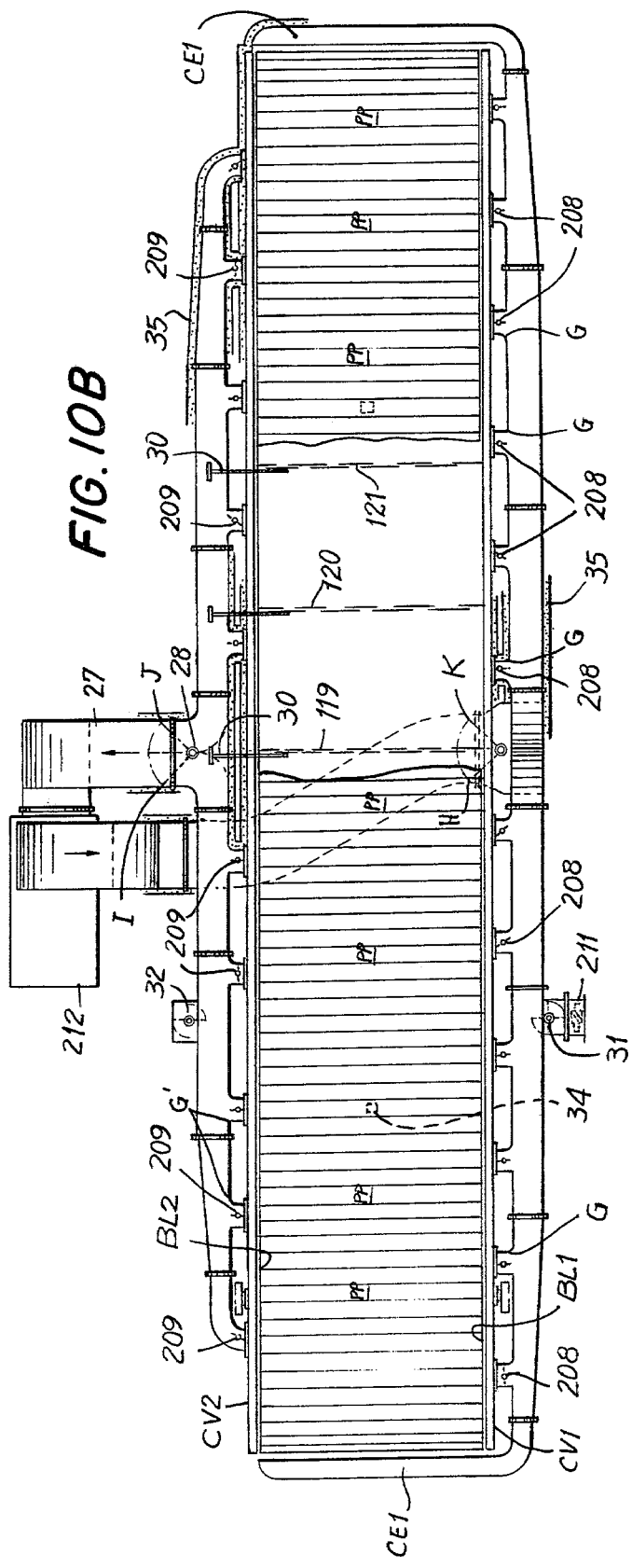

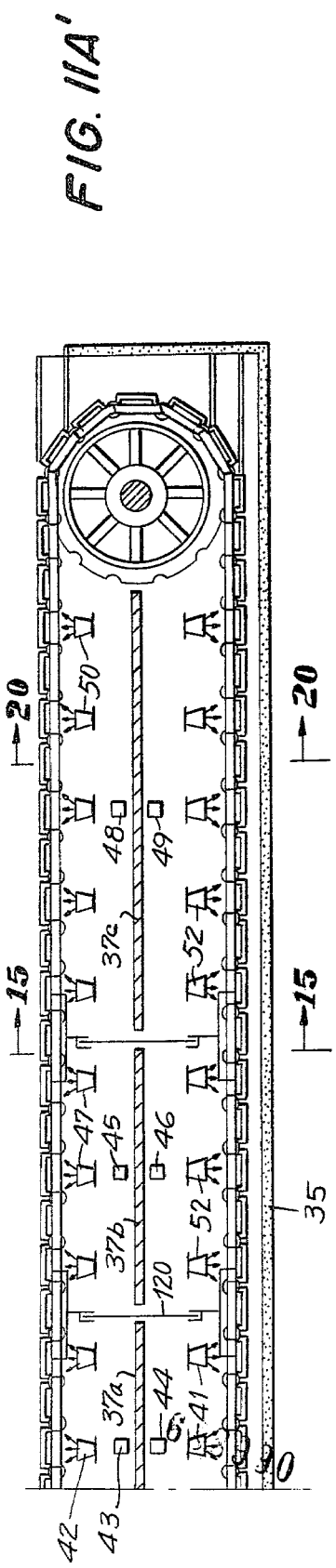
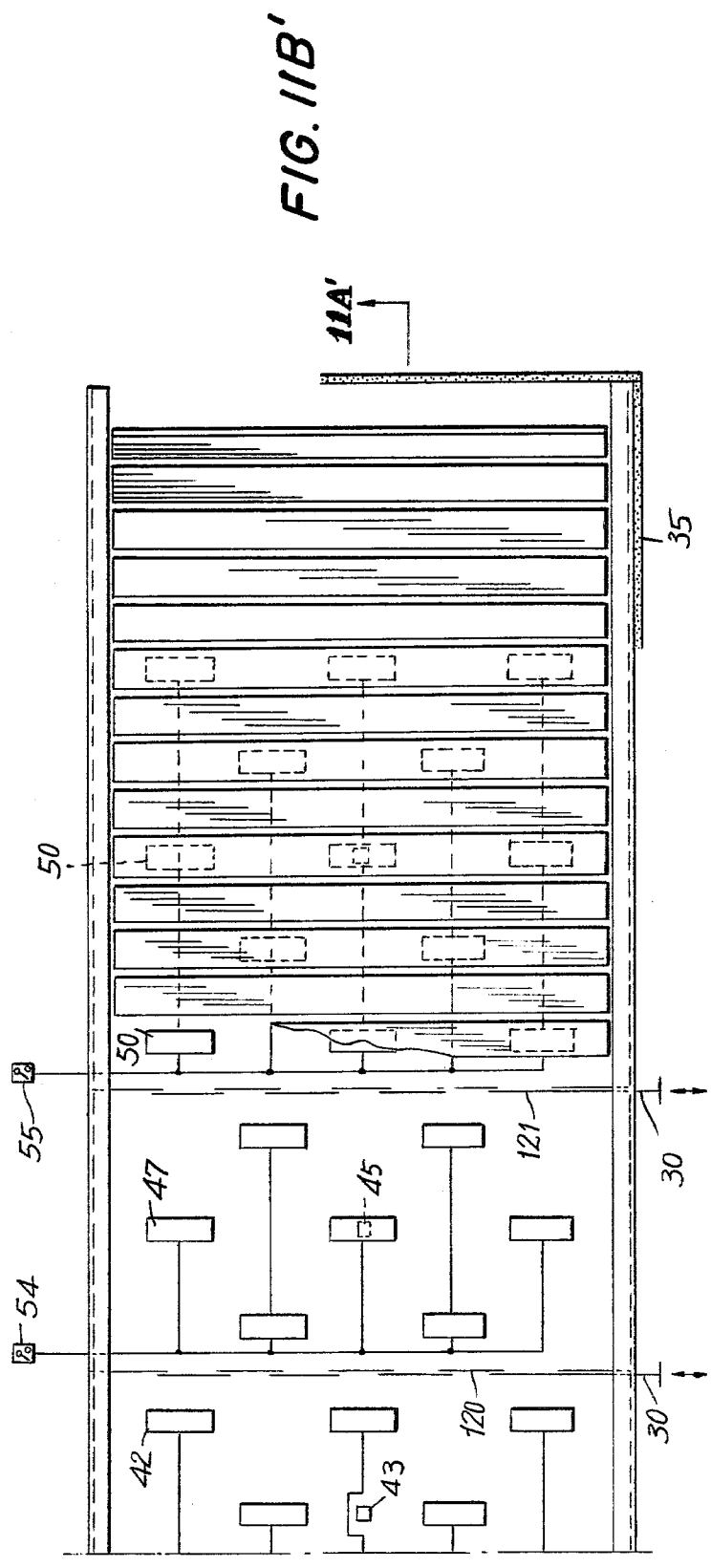
FIG. 11A'
FIG. 11B'

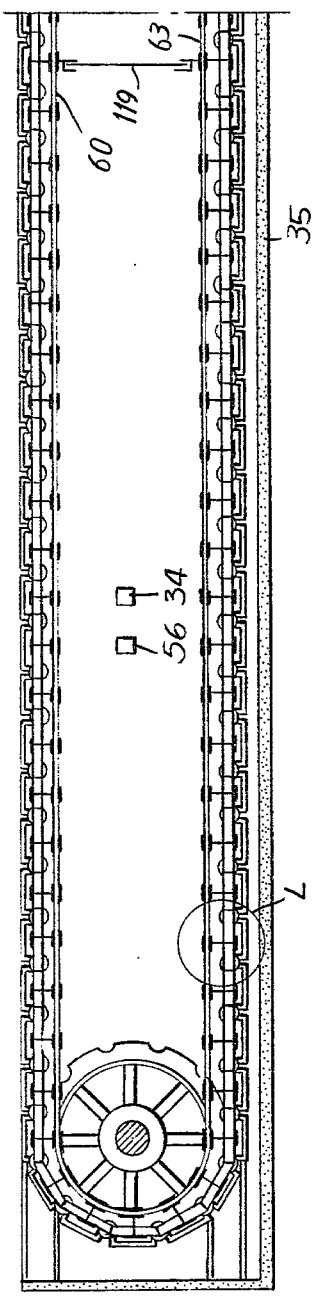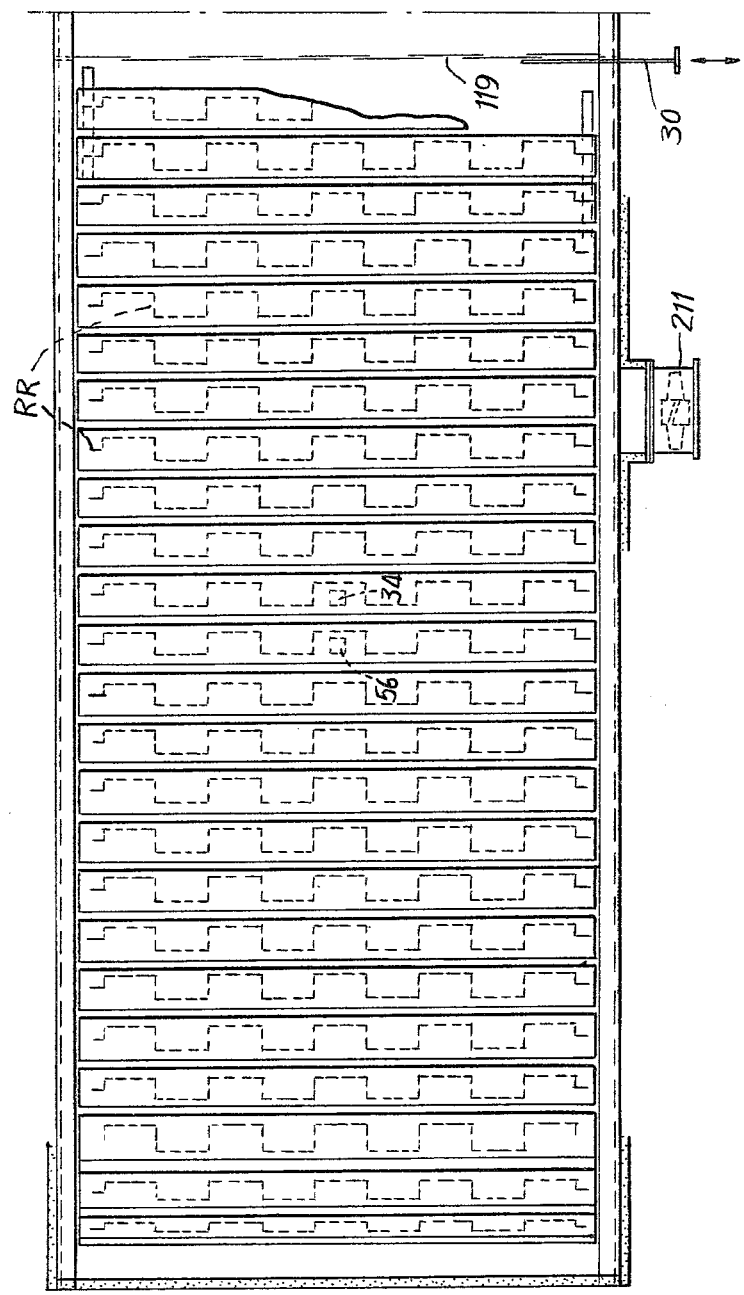
FIG. 12A
FIG. 12B

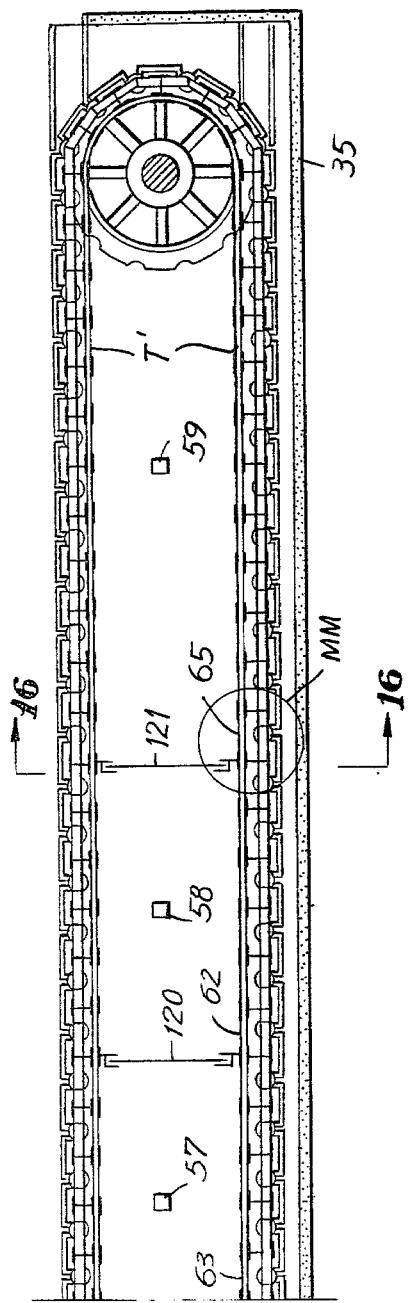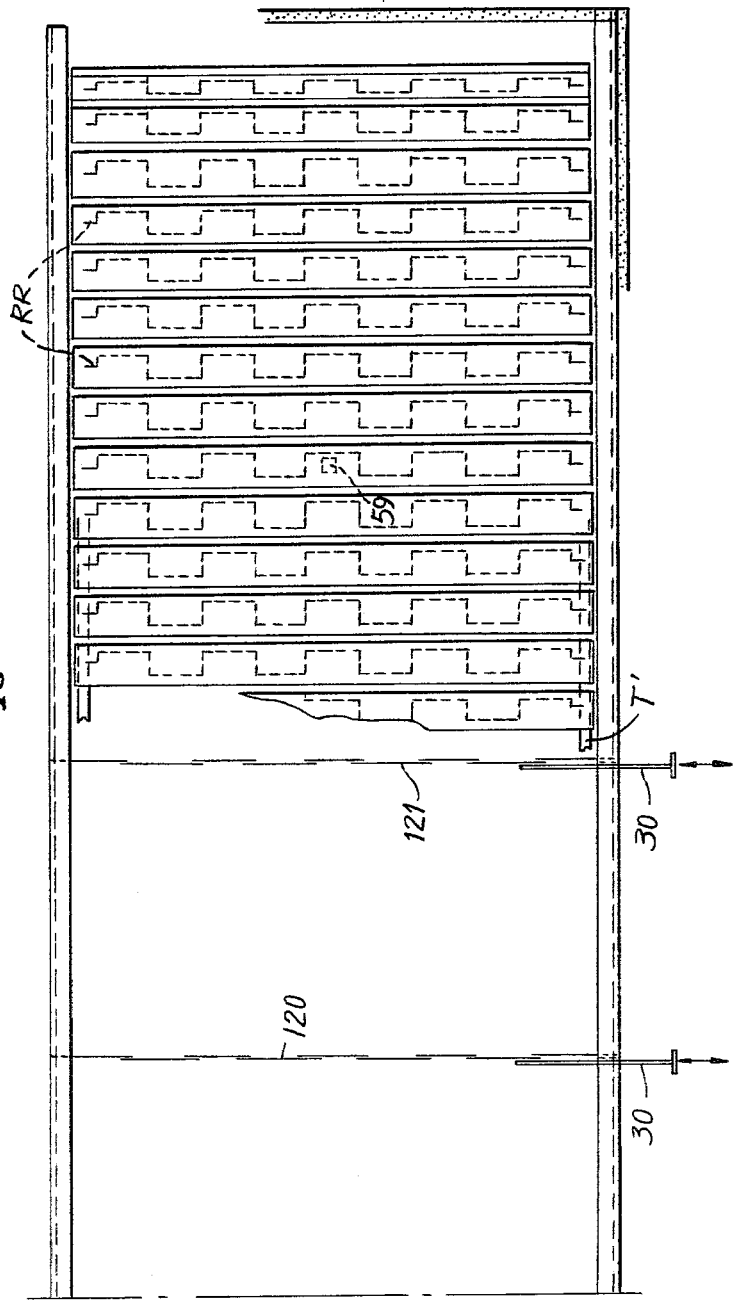

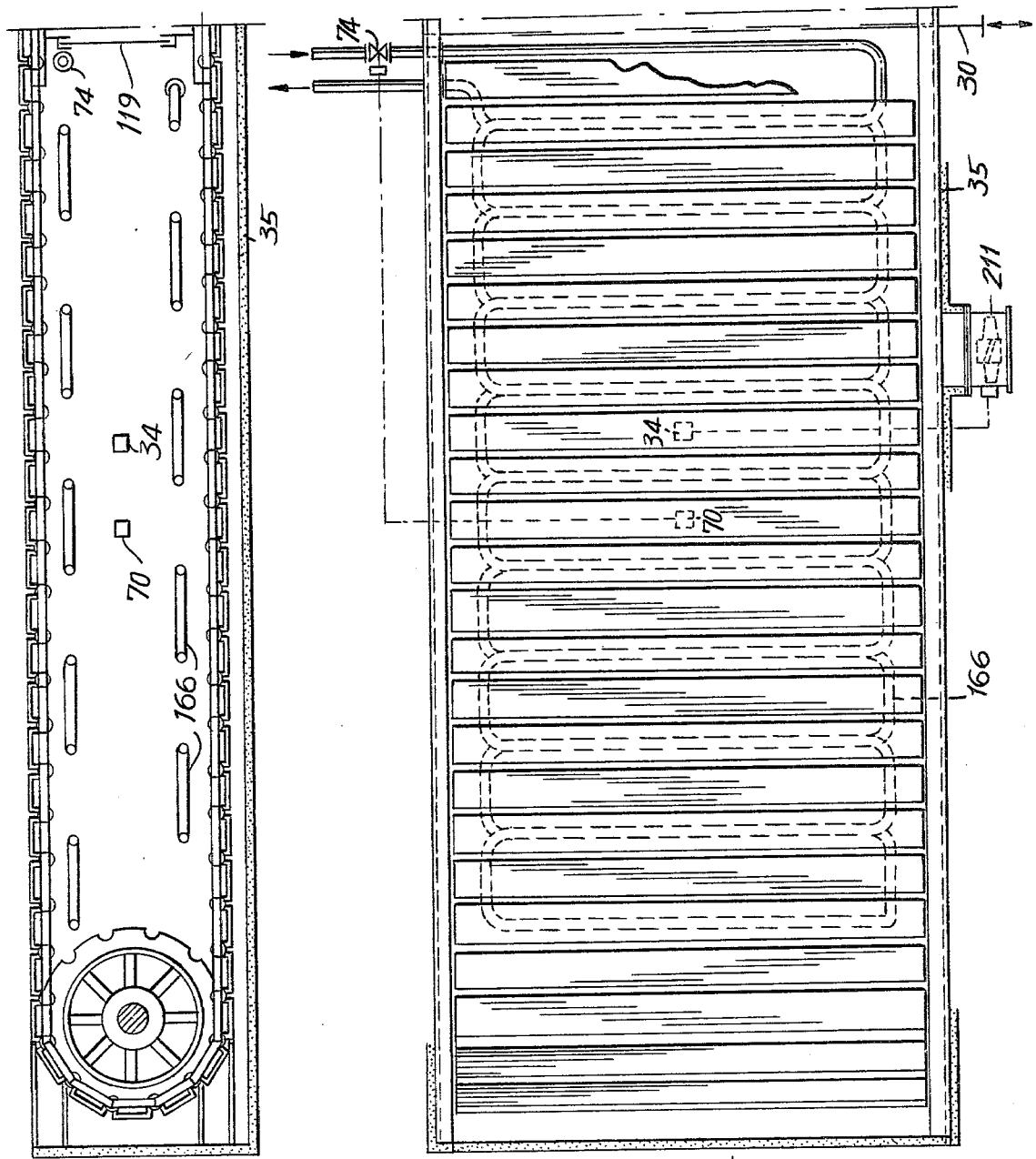

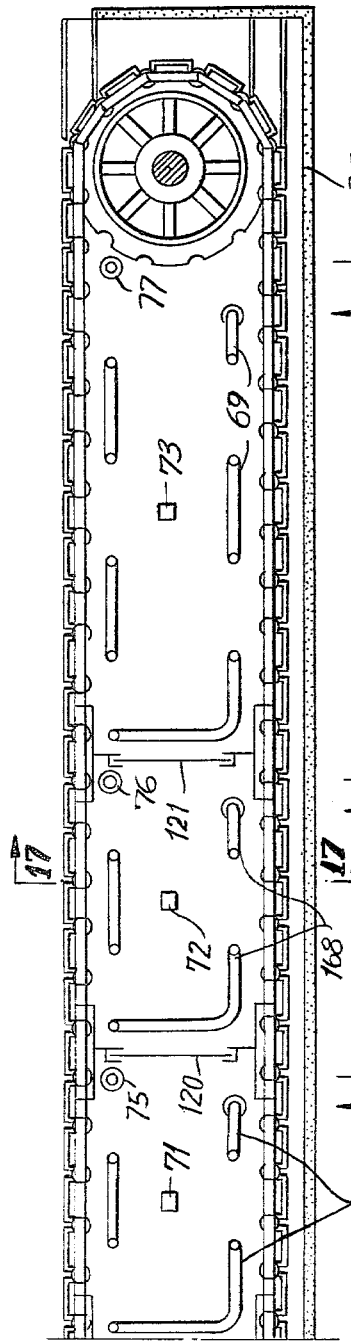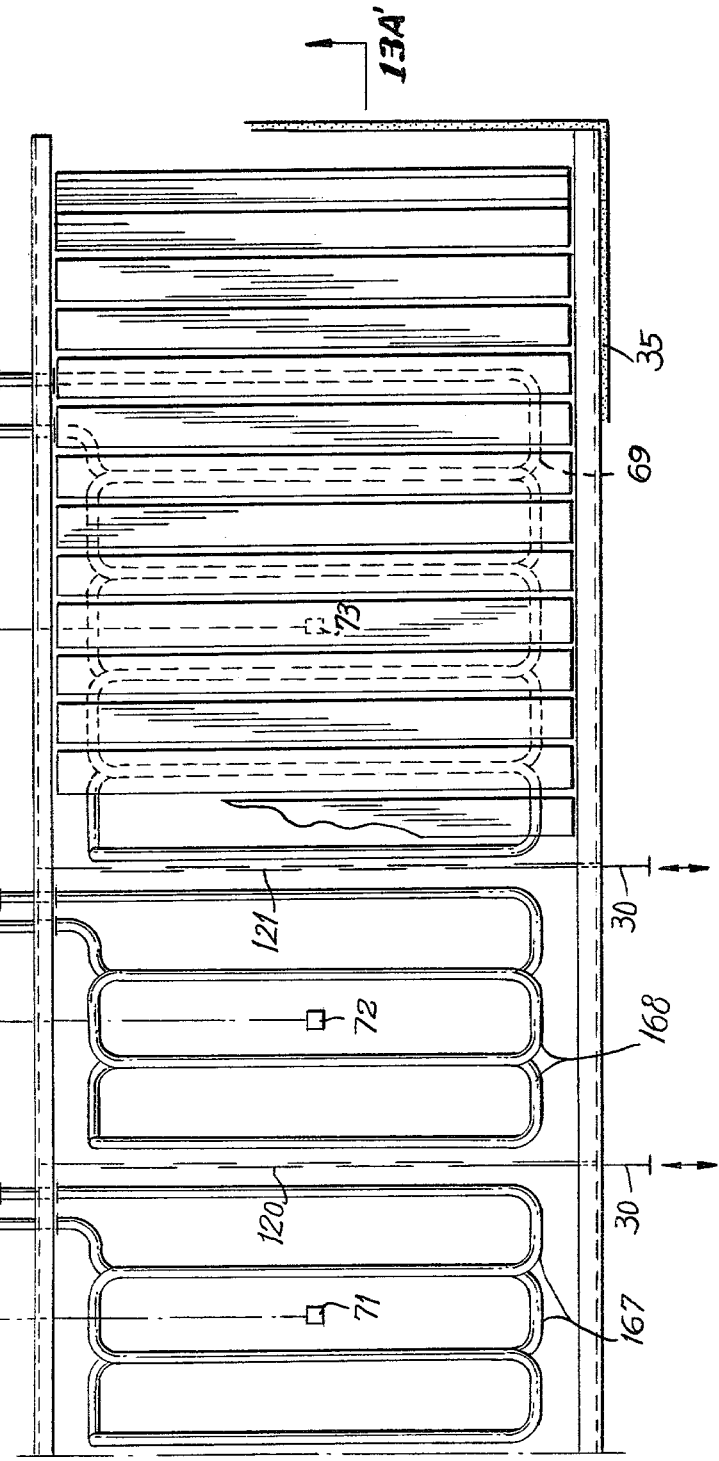

PROCESS AND APPARATUS FOR ELIMINATION OF DENSIFIED AREAS IN BLOCKS OF PLIABLE POLYURETHANE FOAM

CROSS-REFERENCE TO RELATED APPLICATION

This is a continuation-in-part application of Ser. No. 945,893 filed Sept. 26, 1978, now abandoned which is a continuation-in-part application of Ser. No. 777,840, filed Mar. 15, 1977, now abandoned.

BACKGROUND OF THE INVENTION

The present invention relates to an important improvement obtained in the manufacture of blocks of polyurethane foam, specifically the elimination, during manufacture, of the densified bottom of the blocks, obtained by the usual process.

This invention also relates to an improved apparatus for manufacturing continuous blocks of polyurethane foam and, more particularly, to arrangements for heating the housing of the conveyor belt of the foaming tunnel and parts downstream of the foaming tunnel in an apparatus of this kind.

As is known, polyurethane foam is a plastic which has acquired increasing importance over recent years, having many uses in such different fields as the automotive industry and the food industry.

In the usual process, polyurethane foam is obtained by reacting, on a moving belt, a polyol and polyisocyanate as principal ingredients, together with catalysts, dyes, blowing agents, etc. The physical properties (stiffness, density, cell size, tensile strength, etc.) of the different kinds of polyurethane foam are a function of multiple parameters, the principal ones being the nature of the polyol and of the polyisocyanate, the ratio between both and the blowing agent.

The components in liquid state are vigorously shaken immediately before being deposited on a mechanically operated endless band conveyor. Between this endless band and the poured liquids there is placed a paper web, which will follow the conveyor in its path, so that said liquids do not spill before they solidify following the reaction.

The conveyor is given translatory motion, with suitable speed for each quality of foam. The liquids deposited on the paper web commence reacting, being introduced, by the movement of the band, into a tunnel having an approximate length of 20 meters, with completion therein of the exothermic chemical reaction, via which the foam is produced, increasing by several times (approximately 50) the initial volume of the liquids. Finally there is obtained a pliable and spongy solid which is the polyurethane foam. Naturally, the shape of the cross-section of said block will be that of the tunnel at its base and side walls.

The reasons for manufacturing said polyurethane foam inside a tunnel are as follows:

(1) To prevent dispersion of the toxic gases, principally the $CO_2$ produced in the reaction or, eventually, the toxic gases evaporated as a result of the heat produced.

(2) To obtain the approximate shape of the cross-section of the block, achieving a body with an almost rectangular section. This is usually referred to in this art as "molding effect".

Independently of the type of foam produced, a problem associated with the manufacture of the block is the densification occurring in the bottom thereof, as a result of which it is necessary to waste an important part of the finished material because its density is notably greater than that of the rest of the block.

Experts in the art will admit that it is frequent for the percentage of the densified area to be 5% by weight, even reaching 7% in relation to the total weight of the block. This amount of wasted raw material can be of considerable importance, bearing in mind that the daily production of an average-sized polyurethane foam installation exceeds 20,000 kg.

The formation of this dense area at the bottom is a serious drawback from the economical-industrial point of view because:

(1) It requires a trimming operation of said densified bottom, which consumes time, energy and manpower and requires proper mechanical means, preferably saws designed specifically for this purpose. The densified layer of foam can have a length of more than 100 meters (the length of the block), a width of two meters and a thickness of 10–30 mm.

(2) The trimmed by-product has to be marketed at a notably lower price than the rest of the foam, because of its unsatisfactory properties, its small thickness and irregular shape.

(3) Since the raw materials of polyurethane foam are substances of petrochemical origin, their high cost under present energy crisis circumstances calls for maximum utilization of the finished products which are used for manufacture.

The preceding problems are solved by the process of the invention, which provides a block without the densified area, thus attaining notable utilization of the raw materials and, consequently, a substantial saving in manufacturing costs.

As far as the inventor is aware, in this field there is no process resulting in the production of blocks without the densified bottom, as attained with the process of the invention, which can be implemented by the improved apparatus which is also an object of the invention.

SUMMARY OF THE INVENTION

In one essential aspect, the process of the invention requires heating in a controlled manner all the parts of the system where manufacture is carried out which are in engagement with said reaction mass. Said parts are basically represented by the surface of the band in engagement with the paper and the walls of the tunnel. Although a block lacking a densified bottom is obtained in this way, this nevertheless does not eliminate the operation of mechanically treating the bottom part of the block to remove a certain roughness which remains there.

Such roughness is produced as a consequence of the fact that when the web on which the block rests is withdrawn, part of the foam of the lower zone of the block remains irregularly stuck to the web. Consequently, while a block lacking a densified bottom is obtained, a trimming operation is necessary to cut away a small amount of foam to thus give the bottom surface a smooth and uniform appearance.

As is well known by experts in the art, in the manufacture of blocks of polyurethane foam there rests, on the endless belt upon which the foam is produced, a web of continuous material such as paper, polyethylene film or the like, which web moves along with the endless belt. Said web, which for convenience will hereinafter be called "paper web", is fed from a continuous reel located upstream of the foaming tunnel and is taken up and wound on an appropriate reel downstream of the foaming tunnel. Said paper web is made necessary by the fact that the endless belt does not have a continuously smooth surface, but rather is formed by a series of hinged plates with spaces between them. The inevitable need of the web of paper or other material is easily understood if it is borne in mind that the foam ingredients deposited at the tunnel entrance are liquid at the moment of their mixture in the mixer head, so that if there were no paper web, said mixed liquid would pass into the hinges of the endless belt.

The invention is partly based on the fact that the formation of the skin or compacting results from lack of a uniform temperature in the whole reaction mass because the elements of the system in engagement with the foam under formation are at ambient temperature, whereas the actual foam itself is at the reaction temperature.

Another factor which, together with the temperature, leads to the formation of more compact peripheral areas, is the pressure exerted either by the bottom of the conveyor band, owing to the actual weight of the foam, or by the side walls counteracting the expansion of the foam during its growth.

Both to counteract the differences in temperature and the pressure exerted either by the actual weight of the foam or by the side walls, heat is used to activate the reaction. The heating temperature must be carefully selected within the range comprised between 30° and 100° C., choosing the suitable value for each specific quality of foam. It must be taken into account that the materials forming the polyurethane foam are highly inflammable, this being a factor which additionally requires very exact control of the temperature.

Surprisingly, it is now found that the best results are obtained not by maintaining a constant temperature $T_0$ at all the points of the surface of the endless belt which actually constitutes the foaming tunnel, as was first thought, but rather by differentiating in said surface of this endless belt two zones of different temperatures, designated reaction zone and consolidation zone. In addition, downstream of the foaming tunnel, in the means for drawing the already-consolidated block, there is a third zone designated final heating zone, at a point prior to the withdrawal of the paper web.

The first or reaction zone upstream of the belt is traversed by the forming foam during a period of time which varies according to the time predetermined for each mix. In this zone the surface of the endless belt is maintained at a constant temperature which varies from one foam to another.

The consolidation zone is traversed by the foam during a period of time depending on the predetermined time in the reaction zone.

The fundamental parameters constituting the objects of the invention are defined as follows:
$T_R$ = Surface temperature of the reaction zone.
$T_C$ = Surface temperature of the consolidation zone.
$T_S$ = Surface temperature of the final heating zone.
$t_R$ = The time it takes an element of the endless belt or the bottom part of the paper-lined block which rests on it to traverse the reaction zone, that is, from point Q to point C represented in FIG. 7 of the drawings.
$t_C$ = The time it takes said element to traverse the consolidation zone, that is, from point C to point B represented in FIG. 7 of the drawings.
$t_T$ = The time it takes said element to traverse the floor of the foaming tunnel, that is, from point Q to point B represented in FIG. 7 of the drawings.

If it is borne in mind that the floor of the foaming tunnel traverses the reaction and consolidation zones, it is readily seen that $$t_T = t_R + t_C \tag{1}$$

and as the value of $t_R$ is predetermined for each type of foam, it is deduced that $$t_C = t_T - t_R \tag{2}$$

While the values of $t_R$ and $T_R$ are fixed for a given foam, they vary from one foam to another, since as will be understood by experts in the art, the exothermicity of the reaction of polyurethane formation varies accordingly to the nature of the principal ingredients, and of the ratio between them. As is known, the principal ingredients are polyol and polyisocyanate. However, the percentage of water in the mixture plays an important role.

A fundamental characteristic of the improvements contributed by the present invention is that the surface temperatures of the three zones have the ratio $$T_R < T_C < T_S$$

In general, the difference $T_C - T_R = \Delta T$ ranges from between 10° and 15° C., about 10° C. being preferable. As was indicated in the parent patent application, a temperature above a maximum limit inside the foaming tunnel in the reaction zone can cause cracking of the foam, and even its combustion. Keeping in mind that this cracking temperature varies with the formula between approximately 45° and 70° C., $T_R$ and $T_C$ fulfill the condition $$T_R < T_C \leq 80° \text{ C.}$$

The temperature of the final heating zone $T_S$ can reach apparently high values, ranging between 100° and 250° C., in very short periods of time. This is not contradictory with the reaction temperature range, if it is kept in mind that it is applied at a point outside the foaming tunnel, when the foam has already consolidated.

Although in the foregoing only only one final heating zone has been mentioned, the invention is not necessarily limited to only one zone of this type and there can be several, although practical reasons limit their number to three. However, a single final heating zone is most preferable.

As a consequence of the difference in the mentioned three thermic levels, once the final heating zone is passed and the paper web is removed, a block is obtained having a smooth and uniform surface and no densified bottom, a thin and uniform layer of foam of a density similar to that of the rest of the block having remained adhered to the paper web.

The improved apparatus used according to the invention includes an enclosed insulated housing surrounding the conveyor belt and means for heating the conveyor belt both within the downstream of the foaming tunnel.

As the heating means, it is possible to use any one which is suitable and attains exact control of the appropriate temperature, among which can be cited steam coils, infrared rays, suitably arranged electrical resistors or hot air obtained from a heat exchanger. In any event, said heating systems must be strictly controlled to prevent combustion of the foam.

In the event the hot air system is used, the air can be projected longitudinally or transversely to the movement of the conveyor band. In the first instance, the air can be projected in the travelling direction of the band or in the opposite direction.

For a better understanding of the improvements provided by the invention, a brief description will be given below of the elements comprised by a standard apparatus for producing blocks of polyurethane foam.

The basic elements or parts of said standard apparatus are: A foaming tunnel constituted by a sloped conveyor belt, formed by hinged plates, the floor of the foaming tunnel being constituted by the upper run of said conveyor belt. The rest of the parts of said tunnel is formed by side walls and a ceiling provided with conduits for evacuating the gases which are formed and/or released during the reaction which results in the foam, such as $CO_2$ and blowing agent. In the upstream part of said foaming tunnel there is a mixer-feeder device, in which the various reactants which form the foam are mixed and from which they are fed onto a web, preferably paper, which covers and travels with the upper part of the conveyor belt of the foaming tunnel. After the endless conveyor belt of the foaming tunnel there are several drawing conveyors which move the block formed in the foaming tunnel toward an arrangement of idle rollers, from which the block passes on to be cut and stored.

The aforementioned paper web is interposed on the upper surfaces of all the conveyor belts, being fed from a supply device located upstream from the foaming tunnel and being removed by a collecting device located downstream from the last drawing conveyor and before the idle roller arrangement. Naturally, in the apparatus there are also tanks for reactants, pumps, motors for actuating the conveyors and other necessary devices for its operation.

The conveyor belt is surrounded by a large sized heat insulated box-like housing, in which the upper surface of the upper run of said conveyor belt is flush with the open upper part of said box. Likewise, in one principal embodiment, according to which said housing is heated by hot air, the volume defined by said box is divided by a single cross partition into an upstream chamber and a downstream chamber, both of constant volume. In association with said box arrangement, are heating means other than hot air, as well as cooling means, which allow control of the temperature existing on the upper or conveying surface of the endless belt. Said heating means, in addition to the hot air recirculated through the inside of the box, which constitutes the preferred embodiment, comprise an arrangement of coils with steam, infrared radiation devices and resistors in the plates. According to the type of heat source, the housing of the box requires a plurality of more or less complex elements and devices, which will be described and illustrated in the drawings.

According to a first preferred embodiment, there are provided inside the box-like enclosure or housing cross separating partition means capable of acting in two positions, the first of which, called "open", allows air to flow through them, and the second, called "closed", does not allow air to flow, forming substantially complete airtightness, the partition in closed position constituting the dividing line of the two aforementioned "upstream" and "downstream" areas. The number of these cross partitions is at least three and when the apparatus is operating only one of them is in the closed position, thereby attaining, according to the type of foam manufactured, a given constant volume of the upstream and downstream areas, but variable from one foam to another, which is not possible when using a single partition where both areas are of constant volume. It is to be noted that, according to this first preferred embodiment of the invention, the formation of these two chambers which are variable from one type of foam to another may be used for all the heating means considered and not only for hot air.

According to a second preferred embodiment of the invention, at a place located downstream from the foaming tunnel, between the conveyor belt of the foaming tunnel and the first drawing conveyor, between two drawing conveyors or between the last drawing conveyor and the idle roller arrangement, but before the paper web removing device, there are arranged at least some means for the final heating of the surface of the bottom of the block, in which relatively high temperatures are attained.

BRIEF DESCRIPTION OF THE DRAWINGS

FIG. 3A is a schematic plan view of the conveyor belt arrangement heated according to one embodiment of the invention;

FIG. 3B is an elevational side view of the apparatus of FIG. 3A;

FIG. 4A is a schematic plan view of a second alternative embodiment of the apparatus according to the invention;

FIGS. 4B and 4C are cross-sectional views along line 4B—4B of FIG. 4A and along line 4C—4C of FIG. 4B, respectively;

FIG. 5A is a plan view of a third alternative embodiment of the present invention;

FIGS. 5B and 5C are sectional views taken along line 5B—5B of FIG. 5A and along line 5C—5C of FIG. 5B, respectively;

FIG. 6A is a plan view of a fourth alternative embodiment of the apparatus according to the invention; and FIGS. 6B and 6C are sectional views along lines 6B—6B of FIG. 6A and along line 6C—6C of FIG. 6B, respectively.

FIG. 7 is a schematic side view of a conventional apparatus for making blocks for polyurethane foam, in which with the pertinent modifications the improvements of the invention are carried out.

FIG. 9A is a schematic elevational side view of the apparatus where the insulated housing of the conveyor belt is heated according to the preferred embodiment of the invention, that is, by hot air.

FIG. 9B is a plan view of the complete apparatus of FIG. 9A.

FIG. 10A is an elevational side view of only the conveyor belt arrangement of the foaming tunnel of FIG. 9A.

FIG. 10B is a plan view of the arrangement of FIG. 10A.

FIG. 12A–12A' is a cross-sectional side view of the conveyor belt arrangement of the foaming tunnel, of the embodiment according to which heating is effected by electrical resistors, taken along the line 12A–12A' of FIG. 12B–12B'.

FIG. 12B–12B' is a plan view of the arrangement of FIG. 12A–12A'.

FIG. 13A–13A' is a cross-sectional side view of the conveyor belt arrangement of the foaming tunnel, of the embodiment according to which heating is effected by coils through which steam circulates, taken along the line 13A–13A' of FIG. 13B–13B'.

FIG. 13B–13B' is a plan view of the arrangement of FIG. 13A.

DETAILED DESCRIPTION OF THE INVENTION

Figure 1:
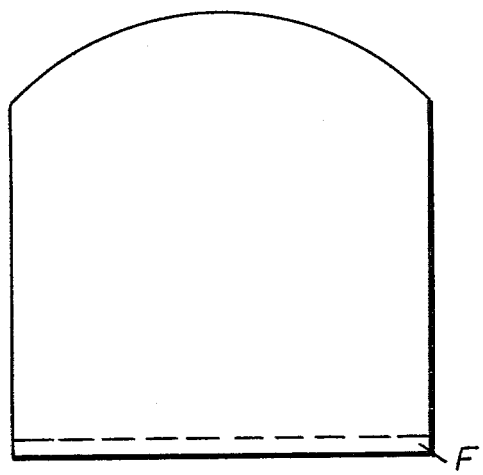
FIG. 1 illustrates the cross-section of a block of foam as obtained by the conventional process.

Referring to FIG. 1, it can be seen that the bottom area F, which, by the influence of a series of factors, among which the weight of the mass plays an important role, presents greater densification when prepared by the conventional process. Although it is not possible to establish an accurate figure, because experts in the art are aware that this can vary from one type of foam to another, the density of the bottom area in the usual process is approximately between 6 and 9 times greater than that of the rest of the block.

Figure 2:
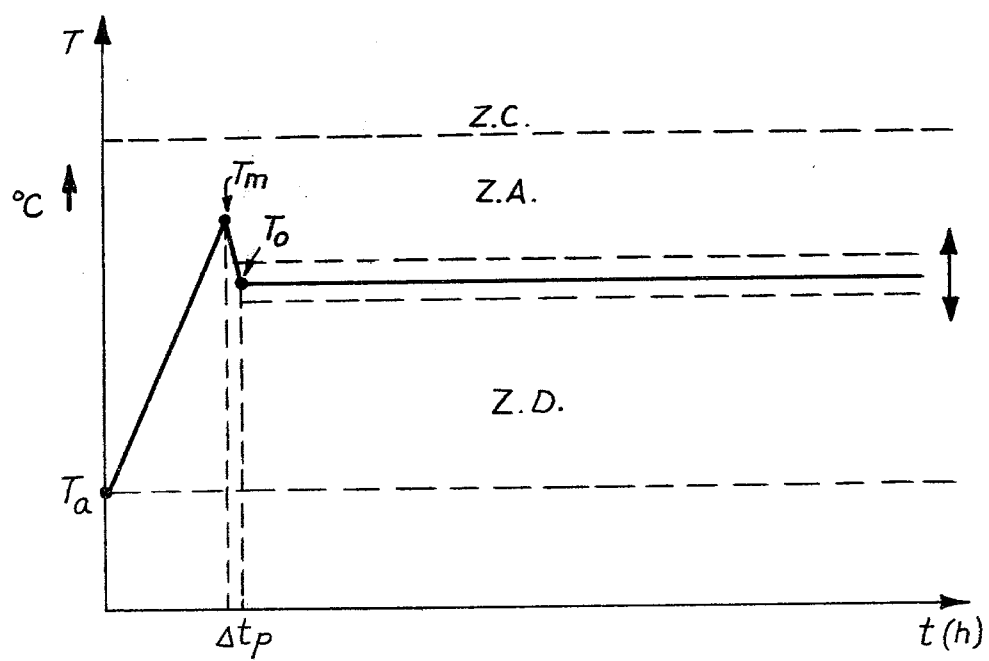
FIG. 2 is a graph which shows the variation of the temperature of the mobile belt illustrated on the y-axis with respect to the time shown on the x-axis during the process of the invention.

The process according to FIG. 2 comprises, as a first step, running an endless belt for a period of time ranging between 15 and 90 minutes, at the same time as heating thereof is commenced, raising the temperature from ambient temperature ($T_a$) to a defined value ($T_m$) within the range comprised between about 40° and about 80° C. The second step commences on reaching point $T_m$, at which movement of the belt is stopped, and at that moment the components of the foam are fed in intimately mixed form through the head, allowing a period of time ($\Delta t_p$) to pass with the belt stopped, during which the temperature drops to point $T_o$. On reaching point $T_o$ movement of the endless belt is resumed, continuing to feed the ingredients and maintaining the temperature $T_o$ on all parts of the belt with suitable control means.

It is extremely important for the attainment of the object of the invention to work at a suitable temperature for each type of foam and to maintain the variation thereof in accordance with the graph of FIG. 2 of the drawings.

Experts in the art will realize that once the temperature is established from point $T_o$, it must be controlled within the range $\Delta T_s$, because otherwise, if a value above the permitted maximum of said range is reached at any point of the belt, cracking of the block occurs and, on the contrary, if the temperature drops below the lower value densification occurs at the bottom. These densification and cracking areas are illustrated in the graph of FIG. 2 as Z.D. and Z.A., respectively. There is a third area, illustrated as Z.C., which is the combustion area of the foam. $T_m$ must be below this value.

According to a preferred embodiment of one aspect of this invention, an apparatus for obtaining continuous blocks of polyurethane foam, of the type without "crust" or more compact layer at their bottom part, comprises a foaming tunnel with the bottom part thereof constituted by the upper or conveying run of a notably wide endless belt, formed in a known manner, by a plurality of plate-like cross members connected in hinged fashion and mounted between end driving and guiding wheels at the ends of the tunnel, and is characterized in that said conveyor belt is surrounded by a large sized heat insulated box-like housing, the upper surface of the upper run of said conveyor belt being arranged flush with the open upper part of said box, in that the inside of said box, particularly the space defined between said conveying and return runs of the belt and between the sides of said box, is divided into an upstream chamber and a downstream chamber by a cross partition which runs from side to side of said box-like housing and along the top thereof, between the lower and upper runs of said conveyor belt; in that there are hot air blowing means, outside said housing, the outlet whereof is connected with a main supply conduit which, passing beneath said housing, subsequently branches-off into two secondary conduits at a point located halfway along the length of said conveyor belt, each of said secondary conduits running toward the respective ends of said housing, each secondary conduit being provided with a plurality of bypasses, uniformly distributed over their length and ending, through adjustable opening outlets, at their associated chamber on one of said sides thereof and in that the opposite side of that same chamber has a plurality of air outlets, likewise uniformly distributed over the length thereof, said outlets also having adjustable openings; in that starting from each of said outlets there is a conduit, all the outlet conduits which start from the side of the upstream chamber meeting at a first air outlet collecting conduit which goes toward the midpoint of the length of said conveyor belt and all the outlet conduits which start from the side of the downstream chamber likewise meeting at a second air outlet collecting conduit which also goes toward said midpoint of said belt, to meet there with said first collecting conduit in order to form a single meain air outlet conduit which is connected in turn with the intake of said hot air blowing means, so that closed circulation of the hot air is obtained.

This arrangement is likewise characterized in that at the branch-off of the mentioned main hot air supply conduit there is a directing valve to allow distribution of the flow of hot air fed by said blowing means to the respective secondary feeding conduits, equally or differently, and in that at the point where said first outlet collecting conduit and said second outlet collecting conduit there is another directing valve, the purpose whereof is similar to that of the first one and the orientation whereof depends on that of the latter.

In an alternative arrangement, said belt is heated with heating means constituted by a coil arranged in said volume on two planes, inside which steam under pressure and at high temperature is circulated from a supply source outside the apparatus.

According to another embodiment, the means used for heating said volume are constituted by a plurality of infrared radiation heating elements, arranged on two planes and directed to radiate heat toward the lower part of the upper run of the conveyor belt and toward the back of the return run of said conveyor belt, all the mentioned heating elements being uniformly distributed over the entire length and breadth of said conveyor belt. In this alternative embodiment there is a dividing partition which runs horizontally over the entire length and breadth of said belt, at mid-height, in said volume, so that it divides the latter into an upper chamber and a lower chamber.

According to a yet further embodiment of the invention, the heating means are constituted by individual electrical resistor heating elements incorporated in each of the platelike elements which form the conveyor belt, which heating elements take the electric current from an arrangement constituted by current collector trolleys which slide in contact with current supply tracks arranged following a trajectory which is adapted to the contour of said conveyor belt.

The invention is further characterized in that there are means for continuously sensing the temperature inside said space and in that these sensing means are adapted to generate control signals, adapted in turn to control, through known means, the operation of the means heating the mentioned space.

Referring to the attached drawings and, in particular, to FIGS. 3A and 3B thereof, they show a conveyor belt embodiment heated according to the invention, designated in general as 1, constituted by a plurality of platelike cross members 2, connected in hinged fashion, and mounted between end driving and guiding wheels, 3, 4, respectively, at the ends of the tunnel, which belt is surrounded by a large sized box-like housing 5, formed by a bottom 6, placed very close to the lower or return run of said conveyor belt, vertical sides 7, 8, also located very close to the side edges 9, 10 of said belt 1 and of a height such that their upper edges are flush with the upper surface of the conveying run of said belt over its entire length, and vertical end plates 11, 12 located close to the end parts of said belt 1, the plate located at the upstream end of the belt (marked 11 in this embodiment) being of a height equal to that of said sides 7, 8, since the plate of the downstream end of said conveyor belt (marked 12 in this embodiment) being of a height lesser than that of said sides 7, 8, said bottom 6, said sides 7, 8 and said end plates 11, 12 being totally or partially made of heat insulating material M and the arrangement being such that the conveyor belt 1 is located inside said insulated housing 5 with the upper surface of its conveying run flush with the edges of said sides 7, 8 end of said upstream end plate 11.

Inside said housing 5, the space defined between said conveying (upper) and return (lower) runs of the belt 1 and between the sides 7, 8 of said box is divided into an upstream chamber 13 and a dowmstream chamber 14 by a cross partition 15 which runs from one side to the other of said box-like housing 5 and along the top, between the lower and upper runs of said conveyor belt.

Outside said housing 5 there are hot air blowing means S, the outlet whereof is connected with a main hot air supply conduit CP which, passing beneath the mentioned housing 5, subsequently branches-off into two secondary conduits CS1, CS2 at a point located halfway along said belt 1, each of said secondary conduits CS1, CS2, running toward the respective ends of said housing. Each of said secondary conduits CS1, CS2 has a plurality of bypasses D, uniformly distributed over their entire length and ending, through adjustable opening outlets 16, in their respective associated chamber 13, 14, on one of said sides, for example 7, and the opposite side, in this case 8, in each chamber has a plurality of air outlets 17, likewise uniformly distributed over the entire length thereof, said outlets 17 also having adjustable openings.

A conduit 18 starts from each of said outlets 17, all the outlet conduits 18 which start from the side 8 of the upstream chamber 13 subsequently meeting at a first air outlet collecting conduit, CCS1, which goes toward the midpoint of the length of said conveyor belt 1. For their part, all the outlet conduits 18 which start from the side 8 of the downstream chamber 14 likewise meet at a second air outlet collecting conduit, CCS2, which also goes toward said midpoint of said belt 1, to meet at 20 with said first conduit CCS1 in order to form a single main air outlet conduit CPS which is connected in turn with the intake A of the mentioned hot air blowing means S, so that closed circuit circulation of the hot air is obtained toward the inside of the box and toward the outside thereof.

At the point where the mentioned main hot air supply conduit CP branches off to form the conduits CS1, CS2, there is a directing valve 21 which allows distribution of the flow of hot air fed by said blowing means S to the respective secondary feeding conduits CS1, CS2, equally or differently, and at point 20 where said first outlet collecting conduit CCS1 and said second outlet collecting conduit CCS2 meet there is another directing valve 22 which performs a similar function on the return flow of air, the orientation thereof depending on the valve 21 which directs the supply flow of hot air.

Furthermore, in said upstream chamber 13 of said boxlike housing 5 there are ventilation means constituted by cooling air blowing means 19 in communication with said space through a flow control valve 23, on one side of said chamber, and air outlet means 24, provided on the opposite side of said chamber 13 and also having a flow control valve 25, and said ventilating air flow control valves 23 and 25 can adopt any position, between a completely closed position and a completely open position, operating in mutually dependent form when an excessive temperature is detected in said upstream chamber 13, above a preset limit value, which might be detrimental for the foaming of the material on the conveyor belt 1, if this belt were to stop as a result of a breakdown, for example.

Each secondary conduit CS1, CS2 for supplying hot air to the inside of said housing 5 is extended, at its end part, into a conduit 26 designed to feed said hot air to the inside of the mentioned housing 5 through the end parts of the latter, said end conduits being provided with several hot air feed openings (not shown) distributed over the entire breadth of the associated end plate 11, 12 of the mentioned housing.

Inside each of said upstream and downstream chambers, 13, 14, respectively, there are temperature sensing means P designed to control, according to the temperature sensed in each of said chambers 13, 14, the position of the air supply and air outlet directing valves, 21, 22, respectively, as well as the opening of said supply outlets 16, on the sides of said housing, and 26 at the end parts thereof, and of said air outlets on the sides of the mentioned housing, these temperature sensing means being capable of actuating the ventilation means 19, 24 provided in said upstream chamber of the apparatus when said preset limit temperature value is exceeded.

Figure 4C:
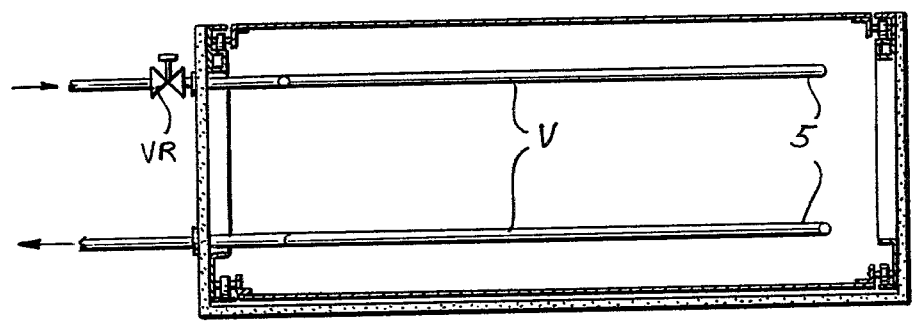

Referring now to FIGS. 4A through 4C, which illustrate a second embodiment of this invention. They show the heat insulated box-like housing 5 which surrounds the conveyor belt 1 on the upper run whereof the material is foamed. In this particular case, in the space defined between the upper and lower run of said belt 1 and the two sides 7, 8 of said housing 5 there is a coil-like conduit V inside which steam circulates under high pressure and at high temperature from a supply source outside the apparatus (not shown) the inlet of steam being controlled with a control valve VR, the position whereof is controlled by the temperature sensor P.

This steam conduit is arranged on two planes, an upper one and a lower one, the sections of the coil being placed on each plane, respectively, close to the back of the upper run of the belt 1 and close to the back of the lower run of the same belt, so that the output of heat from the steam conduit V is distributed over the entire breadth and length of the backs of said runs of the conveyor belt, in order to heat all the mentioned belt as uniformly as possible. On one of the sides of the housing 5 there is a fan, marked 200, adapted to provide movement of the mass of air inside the space to be heated.

Figure 5C:
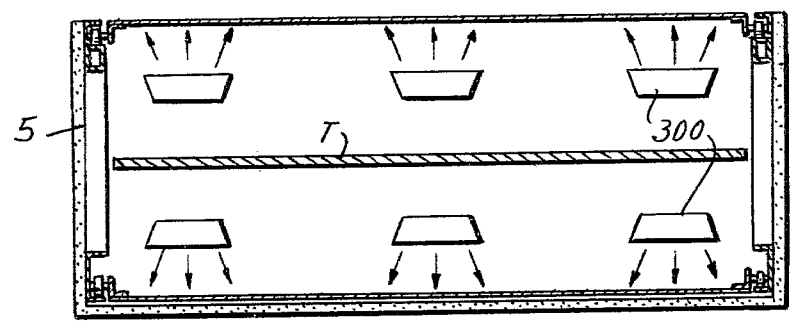
Figure 6C:
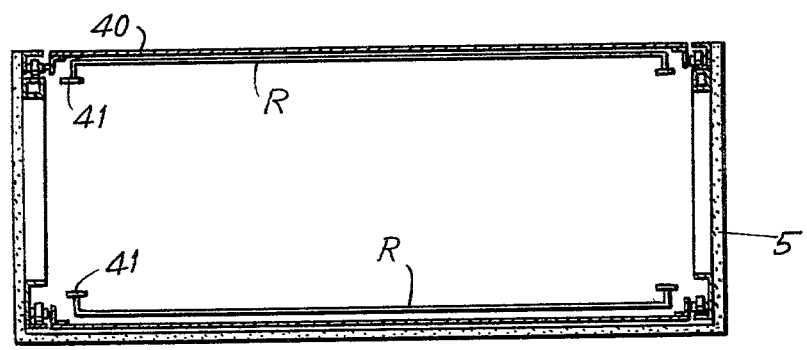
Figure 6D:
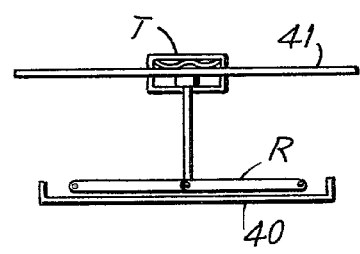
FIG. 6D is a fragmentary view of a detail of the apparatus shown in section in FIG. 6B.

FIGS. 5A and 5B schematically show a third embodiment of the invention, where the upper and lower runs of said conveyor belt 1 are heated by incorporating, inside said space, heating means constituted by a plurality of infrared radiation heating elements 300 arranged on two planes, an upper one, where said elements 300 are directed to radiate heat toward the lower part of the upper run of said conveyor belt 1, and a lower one, where said elements are directed downward, to radiate heat toward the back of the return run of the mentioned belt 1. All these elements 300 are uniformly distributed over the entire length and breadth of the conveyor belt 1, as can be seen in the figures, there being a partition T which runs horizontally over the entire length and breadth of said belt, at mid-height, in said space, to divide the latter into an upper chamber 30 and a lower chamber 31, there being at least one temperature sensing device P which actuates a device controlling the feed of electric power to said heating elements (not shown) in response to the temperature sensed in said upper chamber and in said lower chamber, to control the radiation strength of the elements 300 associated with each of said chambers.

In a contemplated alternative of this third embodiment, in each of said chambers 30 and 31 the temperature could be sensed separately, and therefore, the electric power feed to the heating elements 300, upper or lower, would be controlled independently, with at least two sensing devices and corresponding control means, thus providing the apparatus with greater flexibility.

Referring to FIGS. 6A through 6D, they show a fourth preferred embodiment of this invention.

In this embodiment the conveyor belt is heated with heating means constituted by individual electrical resistor elements R incorporated in each of the plate-like members 40 which form the conveyor belt 1, duly insulated therefrom to avoid faults through passing of electric power to said belt 1.

Electric current is fed to each of said electrical resistor heating elements R through an arrangement (see FIG. 6D) which comprises two trolleys T, one at each end of a plate-like member 40 of said belt 1, each of which trolleys slides in contact with a power supply track 41 arranged following a trajectory which is adapted to the trajectory of said belt 1 over its entire contour, close to its edges.

In an alternative of this fourth embodiment, said two trolleys T would be arranged at the same end of each of said plate-like members 40 of said belt 1, said power supply tracks 41 being placed in mutually adjacent position, close to one or the other edge of said conveyor belt 1, over its entire contour.

As can be seen, FIG. 7 is an excessively simplified representation of the apparatus for producing polyurethane foam in blocks. Said simplification is deliberate, to give a better understanding of the preferred process of the invention.

Seen in said FIG. 7 is the inclined endless belt 101, formed by hinged plates PP, which constitutes the floor of the foaming tunnel the walls of which are numbered 105. Following the belt 101 are the conveyors 102 and 103, forming the means for drawing the already formed and consolidated foam. This Figure shows two of said conveyors, although there can be more. Interposed between the block of foam E and the upper surfaces of the conveyor belts 101, 102 and 103 is the previously mentioned paper web, the supply and take-up reels of which are represented by 104 and 104'.

The sector of belt 101 constituting the reaction zone is represented by QC, CB being the longitudinal border of the consolidation zone. It will be seen from the foregoing that the location of point C, while fixed for a given type of foam, varies from one foam to another and can be to the right or to the left of the position indicated in FIG. 7.

Beyond the foaming tunnel properly speaking there are three final heating zones; represented as $S_1$, $S_2$ and $S_3$ in FIG. 7. Said drying final heating zones are generally of narrower width than the other two zones, the width (or what is the same thing, the time it takes a certain element of the consolidated block to pass through said final heating zone) being related to the temperature in inverse ratio. That is, a relatively narrow drying final heating zone (or its equivalent, a short time in passing that zone) will require a high temperature and vice versa.

Figure 8:
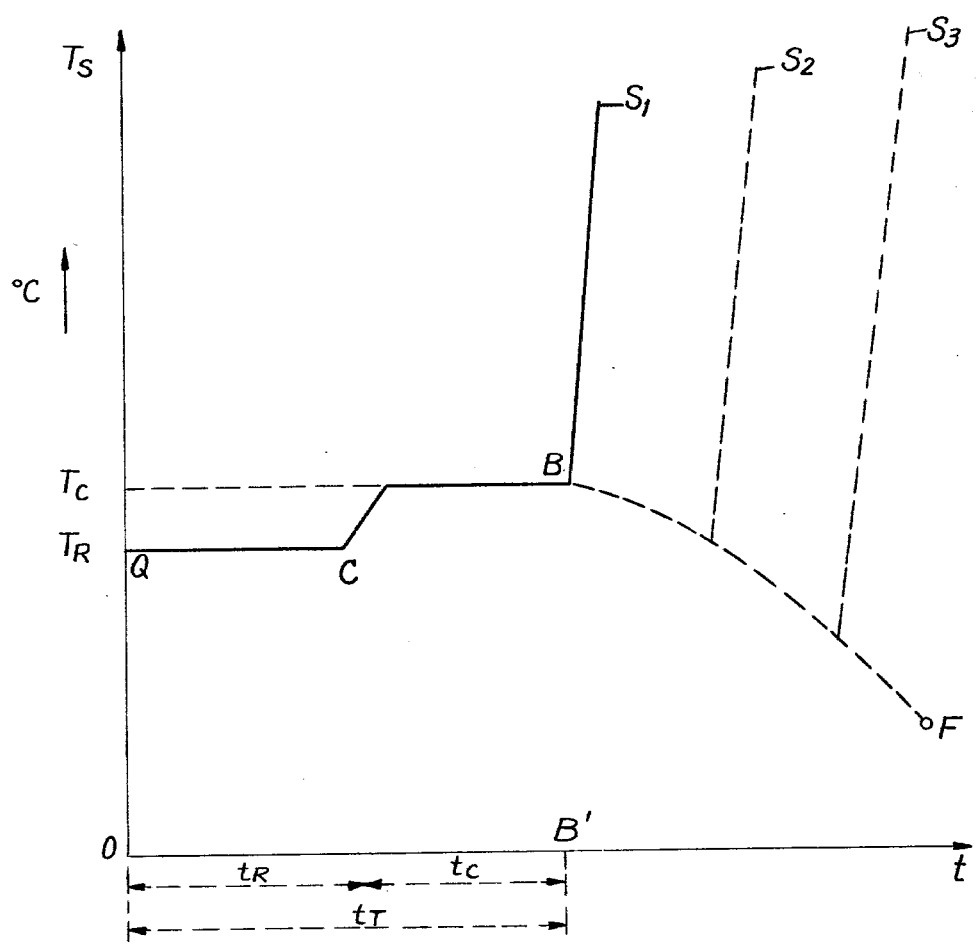
FIG. 8 is a graph showing the temperature variation in °C. (axis ordinate against the time it takes an element of the endless belt of the foaming tunnel to traverse said tunnel (sector OB'). The following sector corresponds to the time it takes a block element to traverse the distance existing between the end of the foaming tunnel and the end of the dry final heating zone.

It can be seen in FIG. 8 how the horizontal length of FIG. 2 appears in two levels, corresponding to the differentiation of the two zones of reaction and consolidation inside the foaming tunnel. It is easily understood that the temperature transition between the cited two zones is not abrupt and thus the existence of the inclined length, point C remaining at a temperature which can be considered as intermediate between $T_R$ and $T_C$. Once the plate element of reference has reached the point of return, the part of the block bottom in contact with said plate of reference undergoes, if the drying final heating zone $S_1$ exists, a rise in temperature until the value $T_{S1}$ is reached. If the drying final heating zone lies downstream, for example at $S_2$ or $S_3$, the temperature of the block commences to diminish, tending to equal that of the atmosphere. The dotted line represented by BF would be the temperature variation with respect to time if there were no drying final heating zones. It is also seen that the farther away the foaming tunnel, the higher the temperature will have to be in the drying final heating zone to counteract the decrease of the consolidation temperature.

It must be noted that the start-up of the apparatus with the operation of the endless belt of the foaming tunnel in the empty state is absolutely identical to the description of the process shown in FIG. 2. Thus FIG. 8 is directed toward emphasis of the double level of the horizontal length of said curve owing to the existence of the two zones of reaction and consolidation and the temperature variation of the bottom upon emerging from the foaming tunnel.

In accordance with the foregoing and once the reaction temperature is reached, which corresponds to the optimum temperature $T_m$ of FIG. 2, and the paper web supply device is functioning, feeding begins of the ingredients which react to form the foam in the upper portion of the foaming tunnel, the temperature being controlled in the surface of the reaction zone to the value $T_R$, and likewise the temperature in the consolidation zone being controlled to the value $T_C$. With start-up, the conveyor belts constituting the floor of the foaming tunnel and the means for drawing the formed and consolidated block at the programmed speed, the temperature is carefully controlled so that its variation with respect to time follows the graph of FIG. 8.

Upon arrival of the block at the final heating zone there is produced the aforementioned phenomenon according to which a thin, uniform film of foam remains adhered to the paper web, as can be verified when taking up said web in the drawing means represented by 104' in FIG. 7. After disengaging from the take-up means the block slides over the idle rollers 106 from the pushing action furnished by the drawing means 102 and 103. The block then passes to the vertical cutting means without having to undergo the once necessary bottom trimming, by reason of a bottom having been obtained of a density equal to that of the rest of the block and lacking surface irregularities.

The removal of the paper web being one of the important aspects of the object improvements of the present application, it must be noted that while previous reference has been made to paper as the most common material used for the web inserted between the block of foam in formation and the rectangular hinged plates which form the endless belt, any other weblike material can be used which fulfills the same function.

The extent of the reaction area, which depends on the reactivity of the formulation, varies from one foam to another. In FIG. 9A of the drawings, X, Y and Z identify the slope of the growth curves of the foam for three formulations of different reactivity. The most reactive foam is that for which the growth curve is identified as X, whereas the least reactive is that for which the growth curve is identified as Z.

Subsequently, a temperature $T_c$ higher than $T_R$ is maintained in a second surface area of the floor of the foaming tunnel, called consolidation area. The value $T_c$ is also kept constant throughout foaming, varying from one foam to another. It is readily realized that since the floor of the foaming tunnel constitutes the reaction and consolidation areas, once the former is established by the reactivity of the foam, the extent of the latter is obtained.

In FIG. 9A of the drawings, the longitudinal edges of the reaction and consolidation areas for the three types of foam would be as indicated in the following table:

|  | REACTION AREA | CONSOLIDATED AREA |
|---|---|---|
| HIGH REACTIVITY FOAM | QB | BF |
| MEDIUM REACTIVITY FOAM | QC | CF |
| LOW REACTIVITY FOAM | QD | DF |

It will be readily realized that the surface of the foaming tunnel, called reaction area here, corresponds to the upper or conveying run of the endless belt of the foaming tunnel of the so-called "upstream" chamber when only one partition is used. Naturally, the surface of the consolidation area corresponds to the upper run of the "downstream" chamber. As indicated above, an important preferred aspect of this application lies in the possibility of altering the volumes of the upstream and downstream chambers or, what amounts to the same, the surfaces of the reaction and consolidation areas to adapt them to the reactivity of the specific foam manufactured.

The third area, called the final heating area, is downstream from the foaming tunnel, between the foaming tunnel and the first of the drawing conveyors 116, between two drawing conveyors (a second conveyor is shown in FIG. 9A as 117, or between the last drawing conveyor and the idle roller arrangement 125. There may be more than one such area and it is always before the place where the paper removing device 114 is located. In said area, the bottom of the moving block E is subjected to a temperature $T_S$ much higher than $T_R$ and $T_C$ for a very short time. This surface final heating temperature is attained precisely with the means for heating the surface of the bottom of the block. FIG. 9A shows three of these final heating areas as 122, 123 and 124.

Thus, the improved apparatus for manufacturing blocks of polyurethane foam makes it possible to obtain the three mentioned temperatures $T_R$, $T_C$ and $T_S$, which fulfill the condition $T_R < T_C < < T_S$. Additionally, the surfaces of the foaming tunnel where the first two mentioned temperatures are attained, that is, reaction area ($T_R$) and consolidation area ($T_C$), may vary according to the reactivity of the foam.

The remaining parts of the apparatus of FIG. 9A are as follows:

111 is the mixer-feeder head, 112 is a side wall of the foaming tunnel, 113 is the paper web supplying device, 115 is the conveyor belt of the foaming tunnel, formed by platelike members identified as PP in FIG. 10B, 118 are conduits for evacuating the gases formed and/or released during the reaction in the foaming tunnel, such as $CO_2$, Freon, etc. In FIG. 10A RA is the driving wheel of the conveyor belt 115 and RG is the guiding wheel of said belt. The remaining parts of the apparatus shown in FIG. 9A will be defined hereinafter in relation to other figures of the drawings where they also appear.

The elements of the improved arrangement of the conveyor belt of the foaming tunnel which are common to the different heating means and which are shown in FIGS. 9A to 13B are described below.

Said conveyor belt 115 is surrounded by a large sized heat insulated box-like housing 35, the upper surface of the conveying run of said conveyor belt being arranged flush with the open upper part of said box. Said box-like housing 35 is formed by a bottom 110, located at a very short distance from the lower or return run of said conveyor belt 115, vertical sides CV1 and CV2, also located at a very short distance from the side edges BL1 and BL2 of said conveyor belt 115 and of a height such that their upper edges are flush with the upper surface of the conveying run of said belt over its entire length, and vertical end plates PE1 and PE2 located close to the end parts of said conveyor belt 115. The plate located upstream from the belt, that is, PE2, is of a height equal to that of said sides CV1 and CV2, whereas the plate PE1 is of a height lesser than that of said sides CV1 and CV2. The parts forming said housing 35, that is, the bottom 110, the vertical sides CV1 and CV2, and the end plates PE1 and PE2 are totally or partially made of heat insulating material.

In the inside of said box, that is, the volume defined by said conveying and return runs of the belt and between the sides of said box, there are three cross separating partition means 119, 120 and 121 capable of acting in closed and open positions, only one being in the closed position during the operation of the apparatus, the other two being in the open position. Whatever the heating means may be, it is thus possible to form the two upstream and downstream chambers, or reaction and consolidation chambers, which may vary in volume according to the reactivity of the foam which it may be desired to produce. In fact, if it is desired to manufacture a high reactivity foam the partition means 119 will be in the closed position, whereas the partition means 120 and 121 will be in the open position. When an intermediate reactivity foam is involved, the partition means 120 will be closed, and 119 and 121 open. When a low reactivity foam is involved, the partition means 121 will be closed, and 119 and 120 open. Naturally, only the partition means which are closed will allow an airtight insulation between the two chambers, thereby obtaining, with the programmed use of the heating means, the two different heat levels on both sides of the closed partition means, in such a way that the temperatures $T_R$ and $T_C$ are attained on the surface of the endless conveyor belt. Said separating partition means, the positions whereof are actuated by rod means 30, will be defined hereinafter in detail in the explanation of FIGS. 14, 15, 16, 18, 19 and 20.

Between the end plate PE2, close to the mixer-feeder head 111, and the first separating partition means 119, on the side CV1, that is, in a part of the upstream chamber which always forms part of the reaction chamber, there is a fan 211, the function whereof is to start operating and drive cold air into the enclosure of the upstream or reaction chamber when a temperature exceeding the programmed temperature $T_R$ is reached.

According to a preferred embodiment, the heating means are constituted by hot air recirculated in a closed circuit from an installation located outside the conveyor belt arrangement of the foaming tunnel. This embodiment is shown in FIGS. 9A, 9B, 10A and 10B.

Outside said housing 35 there are hot air blowing means 212, the outlet whereof is connected with a main hot air supply conduit 126 which, passing beneath the mentioned housing 35, subsequently branches-off into two secondary conduits 66 and 66' at a point located halfway along said conveyor belt 115, each of said secondary conduits 66 and 66' running toward the respective ends of said housing, adjacent to the side. Starting from each of said secondary conduits 66 and 66' there is a plurality of bypasses G, at the outlet whereof there are air inlet control valves 208, some of them ending in the reaction chamber and others in the consolidation chamber, on the side CV1. Starting from the opposite side, that is, CV2, there is a plurality of bypasses G', at the outlet whereof there are air outlet control valves 209. Said bypasses G' are inserted in two air outlet collecting conduits 107 and 107', which meet at a point located halfway along said conveyor belt, in order to form a single main air outlet conduit identified as 27, which is connected in turn with the intake of the blowing means 212, thereby obtaining closed circuit circulation of the hot air toward the inside of the box and toward the outside thereof.

At the point where the mentioned main hot air supply conduit 126 branches-off to form the secondary conduits 66 and 66' there is a directing valve 29 which allows distribution of the flow of hot air fed by the blowing means 212 to the respective secondary feeding conduits 66 and 66', equally or differently. Likewise, at the point where the outlet collecting conduits 107 and 107' meet to form the collecting conduit 27 there is another directing valve 28, which performs a similar mission on the return flow of air, the orientation thereof depending on that of the aforementioned valve 29.

In FIG. 10B the extreme positions of said valves 29 and 28 are shown as H, I, J and K, respectively.

The aforementioned fan 211 is on the side CV1, in communication with the volume of the reaction chamber through a flow control valve 31. On the opposite side CV2 there is an assembly 32 of air outlet means also provided with a flow control valve. Said cooling air inlet and outlet flow control valves can adopt any position, between a completly closed and a completely open position, operating in mutually dependent form if an excessive temperature were detected in said reaction chamber, above a preset limit value, which might be detrimental for the foaming of the material on the conveyor belt 115 if said belt were to stop as a result of a breakdown, for example.

Each secondary conduit 66 and 66' for supplying hot air to the inside of said housing 35 extends at its end part into the conduits CE1 and CE2 adapted to feed said hot air to the inside of the mentioned housing through the end parts of the latter, said conduits being provided with several hot air feeding outlets (not shown) distributed over the entire breadth of the corresponding end plates PE1 and PE2.

Inside said housing, at one point located to the left of the separating partition means 119 and another to the right of the separating partition means 121, that is, at places which are always a reaction and consolidation area, respectively, there are temperature sensing-controlling devices 34 and 33, the function whereof is to control the position of the valves 28 and 29 directing the air outlet and supply, as well as the position of the valves 208 and 209. The sensor 34 can also actuate the fan 211 when the closing of the directing valve 29 and the valves 208 are insufficient to reduce the temperature of the reaction chamber and it also becomes necessary to inject cold air.

Figure 11A:
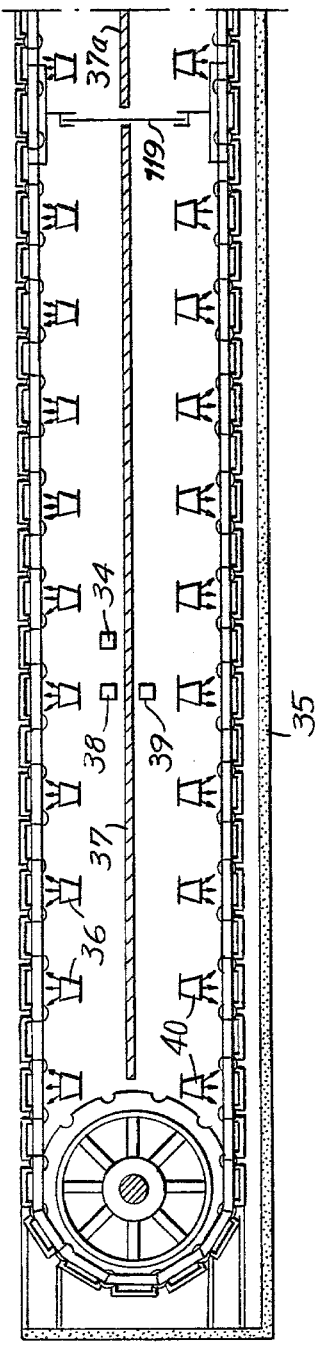
FIG. 11A–11A' is a cross-sectional side view of the conveyor belt arrangement of the foaming tunnel, of the embodiment according to which heating is effected by infrared rays, taken along the line 11A–11A' of FIG. 11B–11B'.

FIGS. 11A–11A', 11B–11B' and 20 schematically show a second embodiment of the invention, in which the upper and lower runs of said conveyor belt 115 are heated by incorporating, inside said volume, heating means constituted by a plurality of infrared radiation heating elements arranged on two planes, an upper one on which said elements are directed to radiate heat toward the lower part of the upper run of said conveyor belt, and another lower plane on which said elements are directed downward to radiate heat toward the back of the return run of the mentioned conveyor belt. In said FIGS. 11A–11A' and 20 the heating elements of the upper plane of the reaction area are as shown as 36, those of the lower plane of said area as 40, the heating elements of the upper plane of the consolidation area are shown as 50, and those of the lower plane as 51. The elements 42 and 47 of the upper plane may belong to the reaction or the consolidation area, depending on which of the partition means 119, 120 or 121 is closed. Similarly, the heating elements 41 and 52 of the lower plane may belong to the reaction or the consolidation area for the same reason. As can be seen in the Figures, there is a dividing partition 37, 37a, 37b and 37c which runs horizontally over the entire length of said belt, at mid height, in said volume, an upper chamber and another lower one thereby also being obtained.

Nine temperature sensing-controlling devices 34, 38, 39, 43, 44, 45, 46, 48 and 49 can be seen in FIGS. 11A–11A'. The one shown as 34, located in the reaction area, performs the same function as the embodiment of FIG. 10A, that is, on detecting a temperature value exceeding the programmed temperature $T_R$ it actuates the fan 211, injecting cold air which runs out through evacuation means not shown in FIGS. 11B–11B'. Those shown as 38, 43 and 45, located in the reaction area on the upper plane, will be adjusted to connect and disconnect the heating elements 36, 42 and 47 to maintain the programmed temperature $T_R$ when the partition means which are closed are those shown as 121. Since the sensing-controlling devices 43 and 45 may belong to the consolidation area, according to which partition means 119 or 120 are closed, their programming to $T_R$ or to $T_C$ will depend on the type of foam produced. The sensing-controlling devices 39, 44 and 46, located on the lower plane, are programmed to a temperature below $T_R$ because when the means 119 and 120 are open the lower chamber, which is known as the approach to the reaction area, requires a lower temperature than $T_R$. The same as those of numbers 43 and 45, the sensing-controlling devices 44 and 46 may belong to the reaction or the consolidation area, depending on which of the means 119 or 120 is closed, and their programming will thus depend on the type of foam produced. The device 48 will connect and disconnect the heating elements 50 to maintain the programmed temperature $T_C$. The devices 43 and 45 will be equally adjusted in the event that the closed means are those shown as 119. Finally, the device 49 will actuate the heating elements 51 to maintain an intermediate temperature between $T_C$ and $T_R$ on the surface of the return run on the back of which the radiation falls.

Figure 11B:
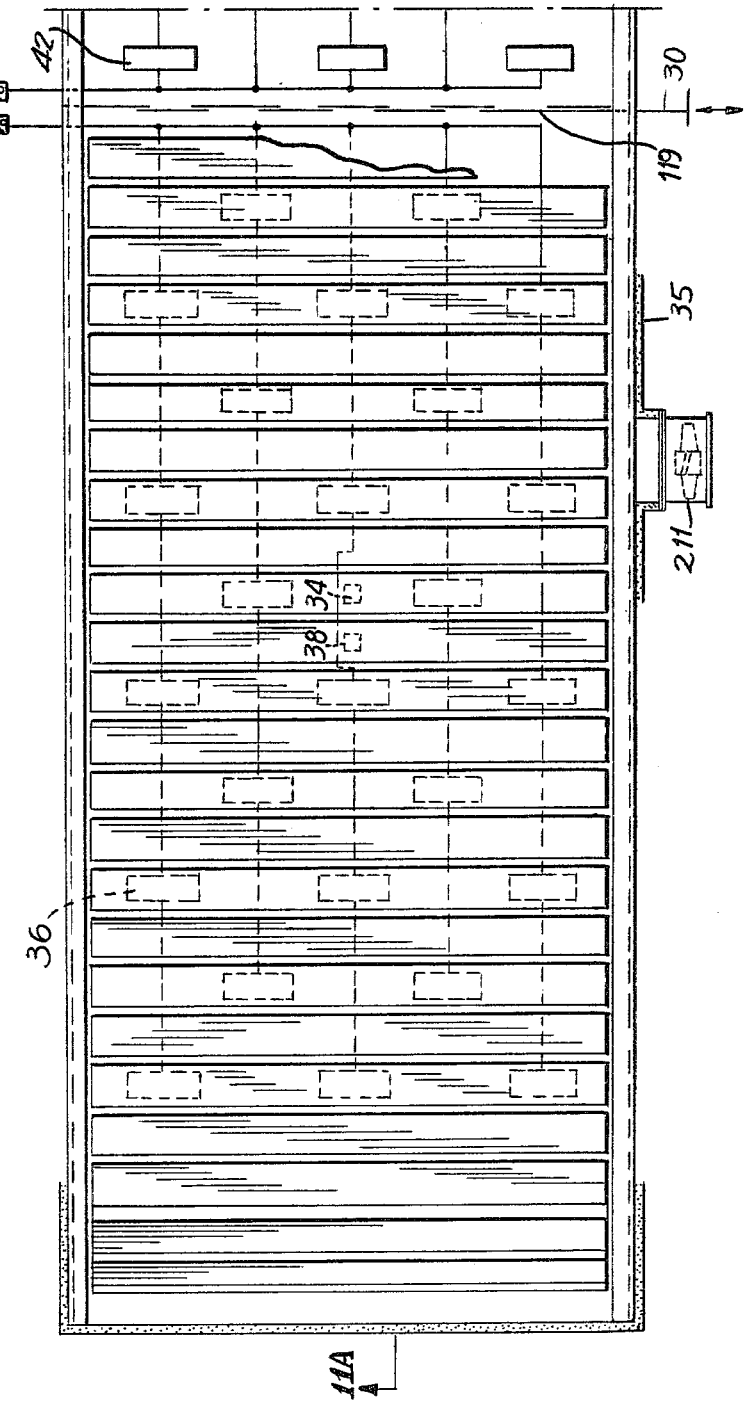
FIG. 11B–11B' is a plan view of the arrangement of FIG. 11A–11A'.
Figure 14:
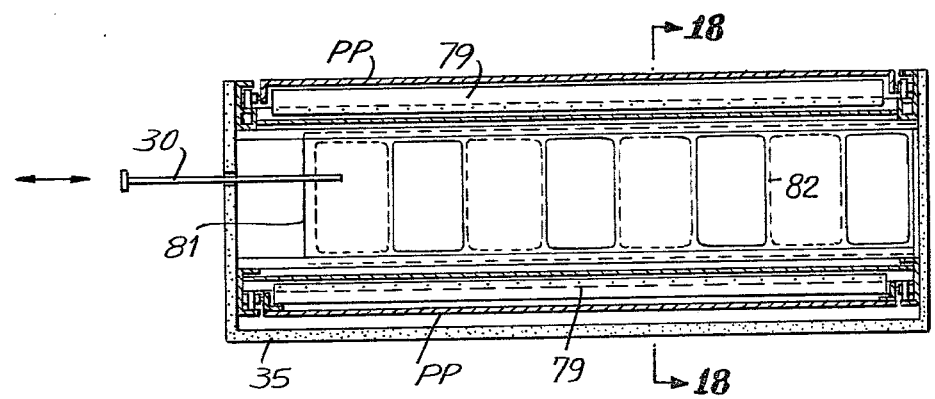
FIGS. 14 and 15 are cross-sectional views along line 14—14 of FIG. 10A and along line 15—15 of FIG. 11A', respectively, and show a front view of one of the aforementioned cross partitions which are capable of acting in two positions, that is, open and closed.
Figure 15:
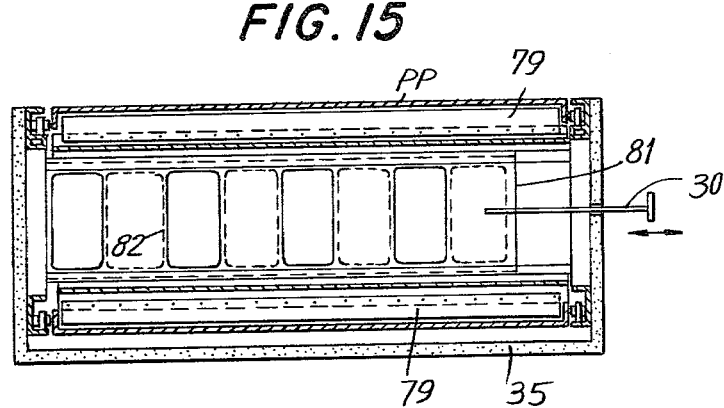
Figure 16:
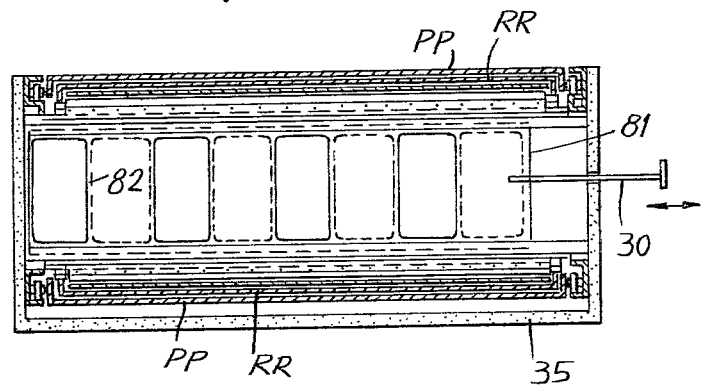
FIGS. 16 and 17, respectively, are cross-sectional views along lines 16—16 and 17—17 of FIGS. 12A' and 13A', respectively, and show a front view of one of the aforementioned cross partition means, in the embodiments according to which heating is effected by electrical resistors and coils with steam, respectively.
Figure 17:
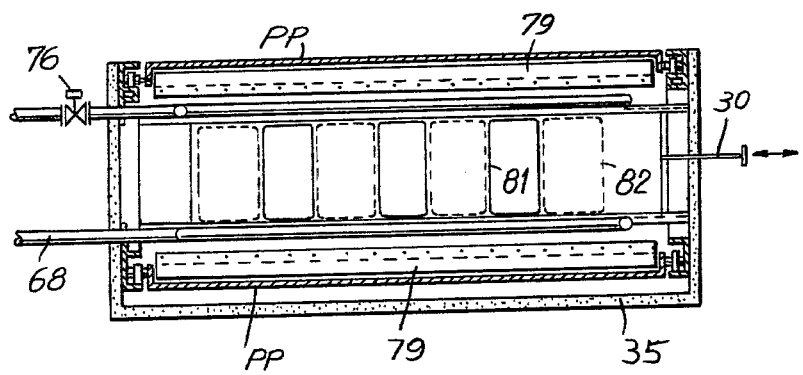

The electric power points actuated by the sensing-controlling devices are shown in FIGS. 11B–11B'. The device 38 actuates 53, the device 43 actuates 53', the device 45 actuates 54 and the device 48 actuates 55. The electric power points for heating elements 40, 41, 52 and 51 of the lower chamber are not shown, but their location and operation will be readily realized. As has been indicated, the device 34 only actuates the fan 211.

In the heating embodiment shown in FIGS. 12A–12A', 12B–12B' and 21, said heating is effected by heating means constituted by individual electrical resistor elements R incorporated in each of the plate-like members PP forming the conveyor belt. In this embodiment said elements R are duly insulated from the members PP to prevent faults through passing of electric power to said belt 115.

Figure 21:
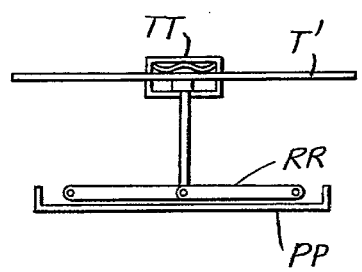
FIG. 21 is an enlarged fragmentary view of the area "L" of the arrangement shown in FIG. 12A.
Figure 22A:
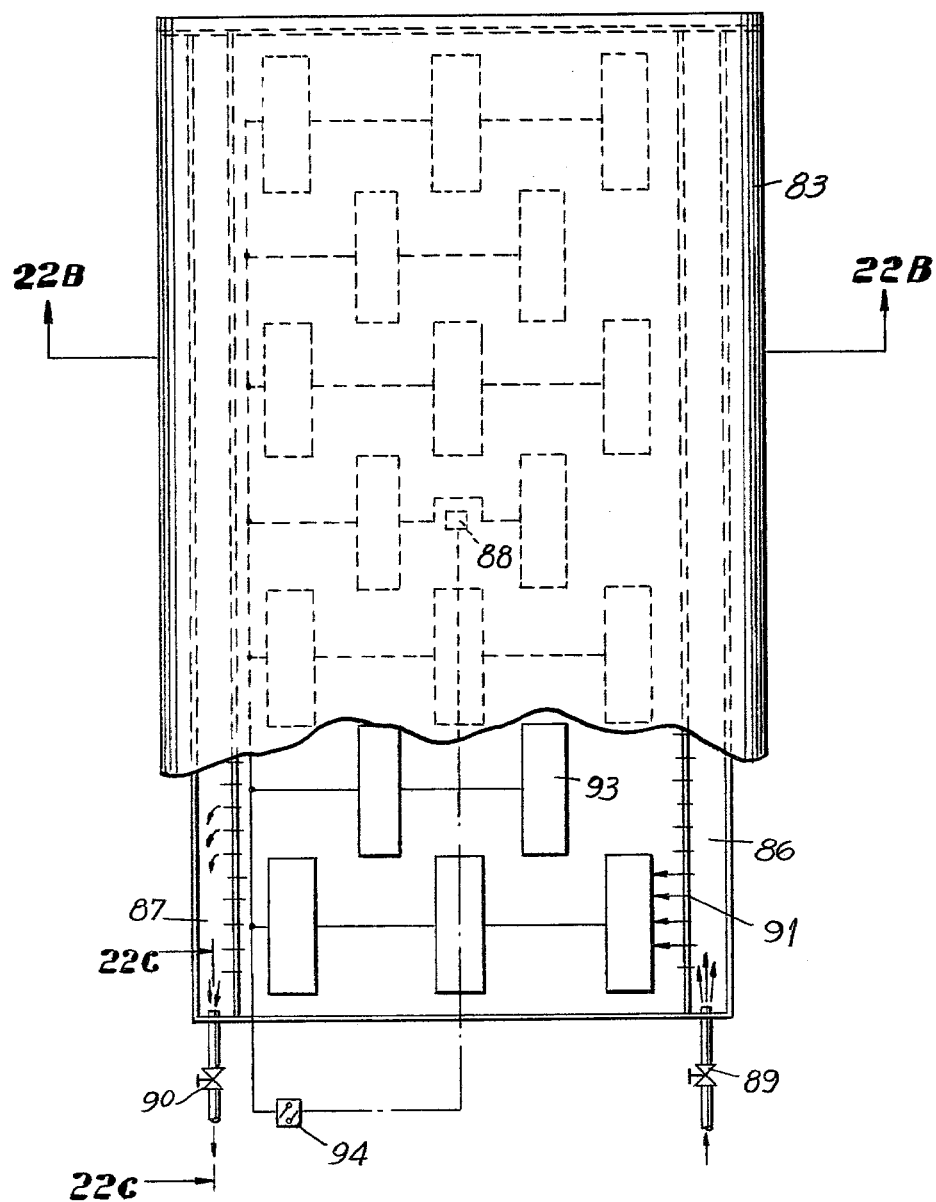
FIG. 22A is a plan view of an embodiment of the final surface heating means for the bottom of the block which constitutes the second aspect of the invention.
Figure 22B:
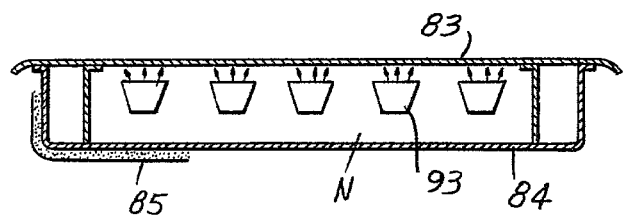
FIGS. 22B and 22C are cross-sectional views along line 22B—22B and along line 22C—22C, respectively, of FIG. 22A.
Figure 22C:
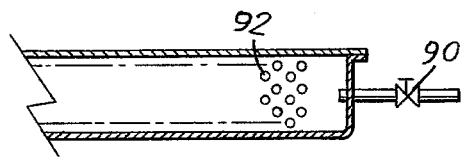

Electric power is fed to each of said electrical resistor heating elements RR through an arrangement (see FIG. 21, enlargement of detail L in FIG. 12A) which comprises two trolleys TT, one being arranged at each end of a member PP of the conveyor belt, each of aid trolleys TT sliding in contact with a power supply track T', arranged following a trajectory which is adapted to that of the conveyor belt over its entire contour, close to its edge parts.

In an alternative of this embodiment, said two trolleys TT are arranged at the same end of each of said members PP of said conveyor belt, in which case said power supply tracks T' are in mutually adjacent arrangement, close to one or the other edge of said conveyor belt, over its entire contour.

Apart from the separating partition means 119, 120 and 121, said FIGS. 12A–12A' and 12B–12B' show the sensing-controlling device 34 which actuates the fan 211, which drives cold air into the reaction enclosure, said air running out through outlet means which are not shown. As has been indicated earlier, this aspect is common to the four embodiments of heating means considered. Said figures likewise show four sensing-controlling devices 56, 57, 58 and 59. The first of them, 56, actuates the feeding of the resistors of the reaction area to connect or disconnect the electric power depending on the programmed temperature $T_R$. Device 59 actuates the feeding of the resistors of the consolidation area to maintain the programmed temperature $T_C$. The sensing-controlling devices 57 and 58 belong to the reaction or the consolidation area depending on which partition means 119 or 120 are closed and, consequently, they will be programmed the same as 56 or as 59. Said resistor connecting-disconnecting points are shown as 60, 61, 62, 63, 64 and 65.

FIGS. 13A–13A' and 13B–13B' show the embodiment according to which the heating means are constituted by coil-like conduits, inside which steam circulates under high pressure and at high temperature, from a supply source outside the installation (not shown). The mentioned FIGS. 13A–13A' and 13B–13B' show the coils of the reaction area 166, those located between the partition means 119 and 120, shown as 167, others located between the partition means 120 and 121, shown as 168, and those located in the consolidation area 169. The inlet of steam to said coils is controlled by the electrovalves 74, 75, 76 and 77, the positions whereof are controlled by the temperature sensing-controlling devices 70, 71, 72 and 73. As can be seen, said steam coils are arranged on two planes, an upper one and another lower one, the coil sections being located on each plane, respectively, close to the back of the upper run of the conveyor belt and close to the back of the lower run of said belt. With this arrangement, the output of heat from the coils is distributed over the entire breadth and length of the backs of said runs of the conveyor belt. Depending on which partition means 119, 120 or 121 are closed, the electrovalves 74, 75, 76 will be programmed in such a way that the steam passing through them produces heat radiation resulting in $T_R$ or $T_C$.

As has been indicated earlier, in the description of the elements common to all the heating embodiments, in the embodiment which is being considered now the sensing-controlling device 34 controls the operation of the fan 211.

A detailed description is given below of one of the cross separating partition means shown as 119, 120, or 121 in FIGS. 9A to 13B–13B'. Said description is made with reference to FIGS. 14, 15, 16, 17, 18 and 19 of the drawings.

Figure 18:
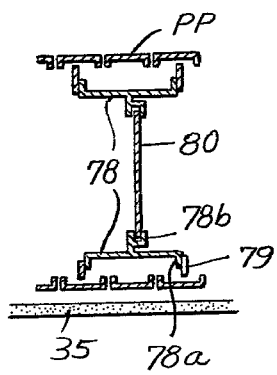
FIG. 18 is a cross-sectional view along line 18—18 of FIG. 14.
Figure 19:
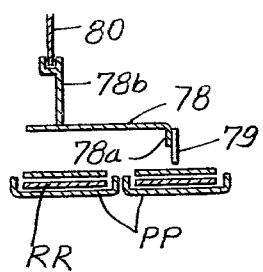
FIG. 19 is an enlarged fragmentary view of the area "MM" of the arrangement shown in FIG. 12A'.
Figure 20:
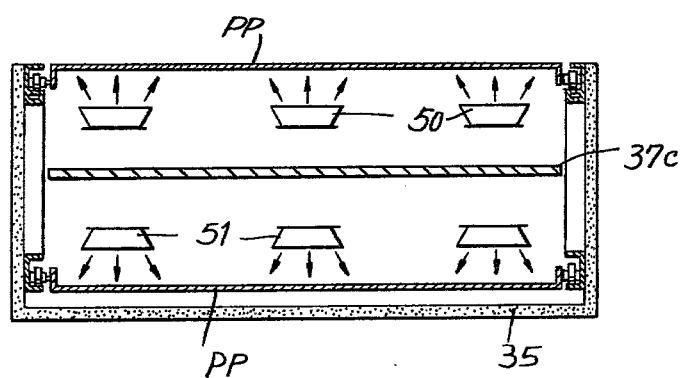
FIG. 20 is a cross-sectional view along line 20—20 of FIG. 11A'.

As has been indicated earlier, FIGS. 14, 15, 16 and 17 correspond to sections along the previously indicated lines of FIGS. 10A, 11A–11A', 12A–12A' and 13A–13A', respectively, and show a front view of said separating partition means. FIG. 18 is a cross-sectional view of the partition means of FIG. 14 along line 18—18 of said FIG. 14. FIG. 19 is an enlarged fragmentary view of the detail identified as MM in FIG. 12A'.

Said partition means are constituted by two equal upper and lower parts 78, formed by a rectangular metal plate or sheet, the edges whereof are bent at right angles toward the same side, forming pairs of flanges 78a, directed toward the back of the plates of the conveyor belt, the width of the flanges 78a being relatively small in comparison with the width of the part 78 from which said flanges 78a project. A fork-like cross-sectional part 78b is affixed from the longitudinal central halfway line of the part 78, in a direction parallel to and opposite said flanges 78a. This part 78b may be affixed to the main portion of the part 78 by welding or by another mechanical means which assures a perfect connection between both portions of said part 78. Respective rectangular parts 79 of flexible plastic material are connected to each of the flanges 78a. There are shutting means 80 between the two parts 78b, resting on the channel portions thereof.

Said shutting means 80 are constituted by two juxtaposed rectangular plates of sheet metal 81 and 82 (perpendicular to the moving direction of the conveyor belt), which are provided with equal window-like openings, which are rectangular in FIGS. 14, 15, 16 and 17, of a width approximately equal to the distance between adjacent sides of two successive windows, although they may be of another shape. One of said plates, that shown in FIG. 14 of the drawings as 81, can slide in a direction perpendicular to the tunnel, being actuated by the rod means 30. On the other hand, the other rectangular metal plate, that is, the one whose rectangular windows are represented by dotted lines in the figures of the drawings, is of fixed position. As can be seen in the drawings, the arrangement of said windows of both plates, in alternating position, is such that there is a position of the slidable metal plate 81, that called "closed", which does not allow air to flow through the shutting means 80, because the windows of both plates 81 and 82 are not in register. Naturally, the "open" position, in which both windows of both plates are in register, allows air to flow through them. It is thus clear how the "closed" and "open" positions of the partition means 119, 120 and 121 are attained. As has been indicated earlier, only one of said three partition means will be operating in the closed position, the other two being in the open position. The function of the parts 79, which are of flexible plastic material, as has been indicated, is to form airtightness on the two portions, upper and lower, of said partition means. As can be seen in FIG. 18, said parts 79 of the resilient nature will be depressed by the two short sides of the cross-section of the moving plates PP, recovering their position thanks to said resiliency, thus forming substantially complete airtightness.

A description is given below of the surface final heating means, located downstream from the foaming tunnel, which constitute another aspect of the improvements provided by this application and which are shown in general as 122, 123 and 124 in FIG. 9A of the drawings. The drying temperature $T_S$ for the bottom of the block of foam is obtained in said surface final heating means.

The description of said surface drying means will be made with reference to FIGS. 22A, 22B, 22C and 23A, 23B, 23C. The first three figures relate to an embodiment which uses infrared radiation elements as heating means, whereas the last three figures relate to another embodiment which uses steam coils as heating means.

Said surface final heating means, whatever may be the heating means used, comprise the following parts: A smooth-surfaced rectangular metal plate 83, the longer side whereof is equal to or slightly larger than the breadth of the block of foam; a housing N adjacent to one side of said plate 83, inside which the means for heating and for cooling said plate are arranged. Said housing is constituted by a shell 84 and a heat insulation 85. The longitudinal central portion of said housing is constituted by the space in which the heating means are arranged, whereas the end parts are occupied by the cooling means. Said cooling means are constituted by a cold air supply conduit shown as 86, adjacent to one of the longitudinal edges of said housing and the side thereof adjacent to the central area occupied by the heating means is provided with orifices 91 which distribute the cold air which enters through said conduit 86 throughout the enclosure of the heating means. On the side opposite said supply conduit 86 there is a collecting conduit 87, also provided with orifices 92, which evacuates to the outside the air which may have cooled the enclosure of the heating means. The electrovalve 89 is at the inlet of the conduit 86 and the electrovalve 90 is at the outlet of the collecting conduit 87.

Said electrovalves 89 and 90 are of the type which start operating when there is an electric power failure. In this specific case, during normal operation said valves would be closed and as soon as there were an electric power cut they would open, injecting compressed air, from an installation which is not shown, into the enclosure of the heating means. The need for said cooling means is imposed by the fact that the surface final heating of the bottom of the block of foam coated with the paper web is caused by contact of said bottom of the block moving over the plate 83 heated by the heating means. As has been indicated earlier, said surface final heating is caused by a very high temperature applied for a very short time. Said time is that which the bottom of the block of foam takes to cross the breadth of the plate 83. If there is an electric power failure the whole apparatus stops, and although the feeding of the heating means may also be cut off (which may not always occur), at the bottom of the block resting in contact with the plate 83 there would be excessively high temperatures which could result in the combustion of the foam. This risk is eliminated with the arrangement of cooling means which has just been described.

Inside the enclosure where the heating means are located there is a temperature sensing-controlling device 88, the specific function whereof will be explained in the description of the heating means, contemplated in the embodiments shown in FIGS. 22 and 23.

In the embodiment of the surface final heating means shown in FIGS. 22 (A, B and C) heating is attained with infrared radiation elements 93 uniformly distributed in the central part of the housing N, which are fed from a source 94. In this embodiment, on detecting a temperature value above the scheduled one in the vicinity of the plate 83 the temperature sensing-controlling device 88 cuts off the feed 94, which is reconnected, by the action of said device 88, when a value below the desired one is reached. In this way, with the action of said device 88, the temperature $T_S$ on the plate 83 is controlled within the desired range.

Figure 23A:
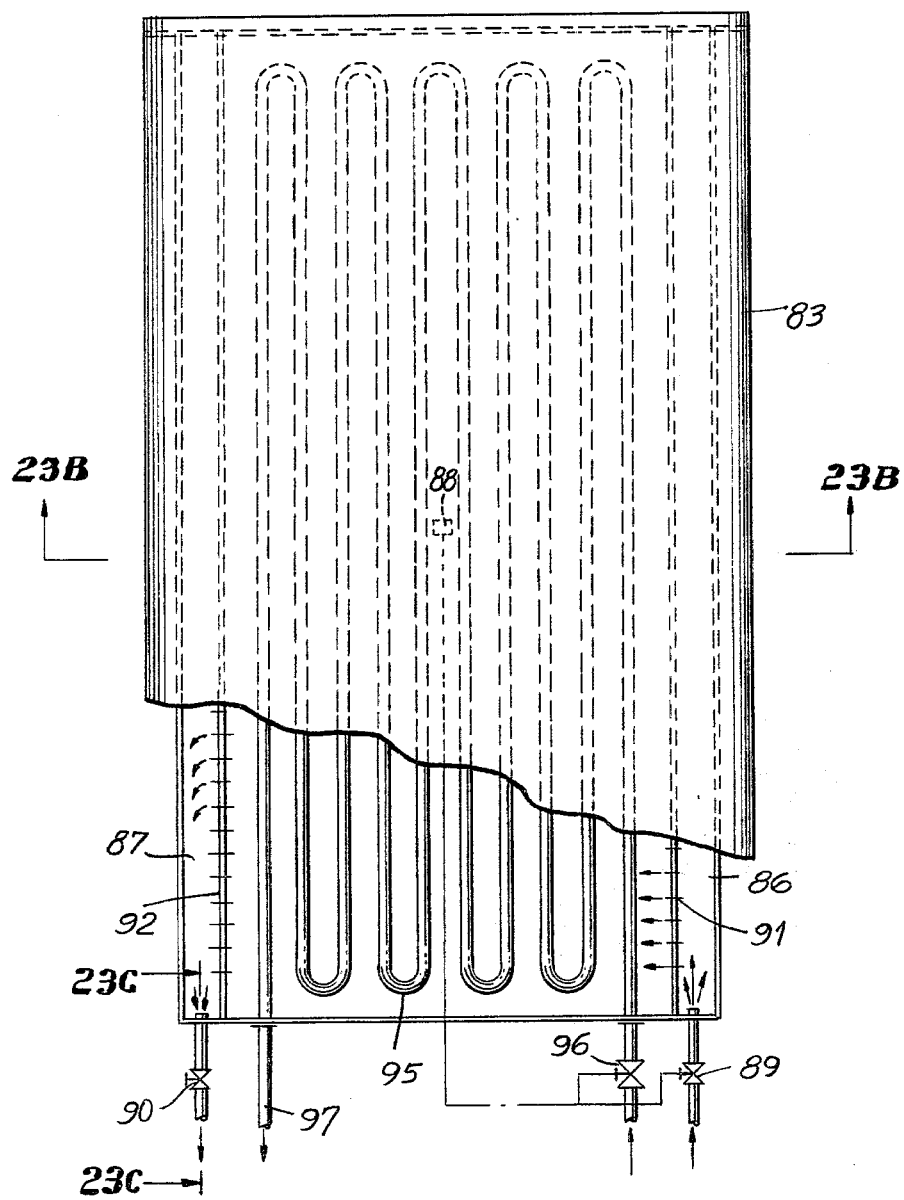
FIG. 23A is a plan view of another embodiment of the final surface heating drying means for the bottom of the block and, finally.
Figure 23B:
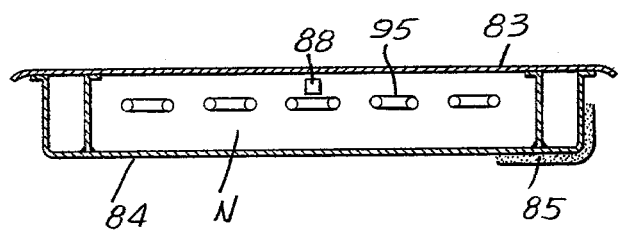
FIGS. 23B and 23C are cross-sectional views along line 23B—23B and along line 23C-23C, respectively of FIG. 23A.
Figure 23C:
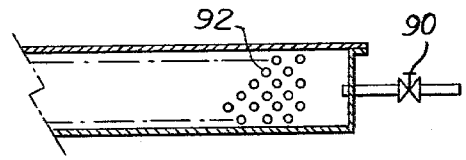

In the second embodiment of the surface final heating means shown in FIGS. 23 (A, B and C), heating is attained with coils 95 through which steam or hot oil circulates. The feed of the fluid which circulates through said coils is controlled by an electrovalve 96, located at the inlet of the coil conduit to the heating enclosure. FIG. 23A shows, as 97, the outlet of said coil from the heating enclosure.

As can be seen in FIG. 23A, in this embodiment the sensing-controlling device 88 controls the operation of the electrovalves 89 and 96. In FIG. 23A the electrovalve 96 which controls the flow of hot fluid (steam or oil) has a function similar to that of the electric power supply source 94, for which reason it is realized that both devices 94 and 96, with similar functions, in both heating embodiments, are governed by the temperature sensing-controlling device 88. However, in the embodiment of FIG. 23A the device 88 also governs the electrovalve 89, which will additionally start operating when there is an electric power failure. This is due to the fact that the steam coil system has more inertia and a slower response than the infrared ray system. It may thus occur that the device 88 senses a temperature $T_S$ above the desired one and orders the valve 96 to close altogether, but this may be insufficient owing to the inertia of the system, for which reason the device 88 is also programmed to actuate the electrovalve 89, allowing the intake of cold air to cool the enclosure N.

In a third embodiment of the surface final heating means, not shown in the drawings, said heating means are constituted by electrical resistors suitably arranged in the enclosure N. However, this is the least preferred embodiment because it is the one which presents the greatest heat inertia and where temperature control on the plate 83 is more difficult.

In the preceding description it is not intended to limit the improved apparatus of the invention to manufacture only three types of foam, since all types, with their corresponding reaction times, as well as the length of their growth curve, are comprised within the three types which have been mentioned above. In any event, the change in position of the cross partition means 119, 120 and 121 also comes within the scope of the invention.

Examples of various foam formulations are given below:

| | | |
|---|---|---|
| 1. | Foam. Density 23 kg/m³ supersoft | |
| | Polyol | 100 |
| | Toluenediisocyanate | 29.5 |
| | Water | 2 |
| | Dimethylaminoethanol | 1 |
| | Silicone | 1.3 |
| | Freon-11 | 16.5 |
| | Tin octoate | 0.3 |
| 2. | Foam. Density 20 kg/m³ | |
| | Polyol | 100 |
| | Toluenediisocyanate | 51.3 |
| | Water | 4.1 |
| | Dimethylaminoethanol | 0.4 |
| | Silicone | 1 |
| | Freon-11 | 6.5 |
| | Tin octoate | 0.2 |
| | Dye | 0.3 |
| 3. | Foam. Density 25 kg/m³ | |
| | Polyol | 100 |
| | Toluenediisocyanate | 50 |
| | Water | 3.9 |
| | Dimethylaminoethanol | 0.4 |
| | Silicone | 1 |
| | Tin octoate | 0.2 |
| | Dye | 0.3 |

The value of $t_o$ (FIG. 2) was 41.5° C.+1° C. when using Formulation 2 and 45° C.±1° C. when using Formulation 3.

It is preferable to modify the apparatus and process so that the above temperatures are maintained only in the first half of the belt, the reaction area, and to increase the temperature in the second half of the belt, the consolidation area, by about ten degrees. Even more preferable is the incorporation in the process of a final third heating zone. This process was used for Formulation 2 above. Maintaining the reaction zone temperature at a value $T_R=41.5°$ C.±1° C. and the consolidation zone temperature at a value $T_C=51.5°±1°$ C., with a time in the reaction zone $t_R=2$ to 3 minutes and a time in the consolidation zone $t_C=3$ to 2 minutes, a block is obtained which after being subjected to a temperature of 120° C. in the final heating zone, and after the paper web has been removed from the bottom, has a uniform density throughout its volume of 20 kg/m³ and a bottom without irregularities which does not require trimming.

I claim:

1. In a method for manufacturing blocks of polyurethane foam by reacting a polyol with a polyisocyanate in the presence of a catalyst and a blowing agent in a foaming tunnel on a web of continuous material supported by a moving endless belt, the improvement comprising varying the surface temperature of the endless belt so that in a first reaction zone located upstream of said endless belt a constant temperature from 30° to 70° C. is attained, and in a second consolidation zone another constant temperature from 10° to 15° C. higher than in the reaction zone and not higher than 80° C. is attained, said temperature values being constant for each type of foam, the time during which said temperature is maintained for each type of foam being determined by the type of foam; after the block has emerged from the foaming tunnel, further heating the lower portion of the block which is maintained at a constant temperature from 100° to 250° C.; and removing the web of continuous material to which a thin film of foam remains adhered, a block of polyurethane foam being obtained having no densified bottom and having a uniform surface which does not require final trimming.

2. The method according to claim 1, wherein the temperature difference between the consolidation zone and the reaction zone is a maximum of 15° C.

3. The method according to claim 1 or 2, wherein the web of continuous material is made of paper or polyethylene film.

4. In an apparatus for obtaining continuous blocks of polyurethane foam which apparatus comprises a foaming tunnel the lower part whereof is constituted by the conveying run of an endless conveyor belt formed by a plurality of plate-like cross members connected in hinged fashion and mounted between end driving and guiding wheels at the ends of the tunnel, the improvement comprising a box-like housing surrounding said conveyor belt, said housing having a bottom, vertical sides of a height such that their upper edges are flush with the surface of the conveying run of said conveyor belt over its entire length, and vertical end plates, the end plate located on the upstream side of said conveyor belt being of a height equal to that of said sides and the end plate located at the downstream side of said conveyor belt being of a height less than that of said sides, said bottom, said sides and said end plates being totally or partially made of heat insulating material and the arrangement being such that the conveyor belt is located inside said insulated housing with the upper surface of its conveying run flush with the edges of said sides and said upstream end plate; a cross partition which runs from side to side of said housing and along the top between the lower and upper runs of said conveyor belt thus dividing the space between the conveying and return runs of the belt and between the sides of said housing into an upstream chamber and a downstream chamber; and heating means adapted to heat said conveyor belt.

5. The apparatus according to claim 4 wherein said heating means comprises hot air blowing means outside said housing; a main hot air supply conduit connected to the outlet of said blowing means and passing beneath said housing; two secondary conduits branching off from the main supply conduit at a point located halfway along said conveyor belt, each of said secondary conduits running toward the respective tnds of said housing; a plurality of bypasses uniformly distributed over the entire length of each secondary conduit; adjustable opening outlets at the end of each secondary conduit in their associated chamber, on one of said sides of said housing; a plurality of adjustable opening outlets, in each chamber, on the other side of said housing, likewise uniformly distributed over the entire length of each secondary conduits; a plurality of outlet conduits starting from each of said air outlets; a first air outlet collecting conduit connected to the outlet conduits from the upstream chamber and which goes toward the midpoint of the length of said conveyor belt; and a second air outlet collecting conduit connected to the outlet conduits from the downstream chamber and which also goes toward said midpoint of said belt, to meet there with said first collecting conduit in order to form a single main air outlet conduit which is connected in turn with the intake of said hot air blowing means, so that closed circuit circulation of the hot air is obtained.

6. The apparatus according to claim 5, further comprising a first directing valve at the branch-off of said main hot air supply which allows distribution of the flow of hot air fed by said blowing means to the respective secondary conduits, equally or differently; and a second direction valve at the point where said first outlet collecting conduit and said second outlet collecting conduit meet which allows distribution of the outlet flow of air, the orientation whereof depends on that of said first directing valve which directs the supply flow of hot air.

7. The apparatus according to claim 5, further comprising in said upstream chamber of said housing, a cool air blowing means; an intake flow control valve providing communication between said chamber and said blowing means; an air outlet means provided on the opposite side of said chamber; an outlet flow control means connected to said air outlet means wherein said cooling air intake flow control valve and said cooling air outlet flow control valve can adopt any position, between a completely closed position and a completely open position, operating in mutually dependent form.

8. The apparatus according to claim 5, wherein each secondary conduit for supplying hot air to the inside of said housing is extended, at its end part, into a conduit designed to feed air to the inside of said housing through the end parts of the latter, said end conduits being provided with several hot air feeding openings distributed over the entire breadth of the associated end plate of said housing.

9. The apparatus according to claim 4, wherein said heating means comprises a coil arranged on two planes: an upper one located beneath and beside the conveying run of said belt and a lower one located above and beside the return run thereof; a source of steam under high pressure and at high temperature located outside the apparatus and a steam conduit connecting said steam source to said coil for circulating steam through said coil.

10. The apparatus according to claim 9, further comprising a steam flow control valve in said steam conduit; and a temperature sensing device which generates a signal adapted to control the flow of steam to said coil by actuating said steam flow control valve.

11. The apparatus according to claim 4, wherein said heating means comprises a plurality of infrared radiation heating elements arranged on two planes, an upper one where said elements are directed to radiate heat toward the lower part of said upper run of the conveyor belt, and a lower one where said elements are directed downward, to radiate heat toward the back of said return run of said conveyor belt, all said heating elements being uniformly distributed over the entire length and breadth of said conveyor belt; and a partition which runs horizontally over the entire length and breadth of said belt, at mid height, in said space, so that it divides the latter into an upper chamber and a lower chamber; temperature sensing means in said chambers; a device controlling the feed of electric power to said upper and lower heating elements and actuated by said temperature sensing means.

12. The apparatus according to claim 11, wherein the sensing of temperature in each of said upper and lower chambers and, therefore, the control of the electric power feed to the upper or lower heating elements is carried out independently, with at least two sensing devices and corresponding control means.

13. The apparatus according to claim 4, further comprising individual electrical resistor elements incorporated in each of the plate-like members which form the conveyor belt, duly insulated therefrom to avoid faults through passing of electric power to said belt; two power supply tracks arranged following a trajectory which is adapted to the trajectory of said conveyor belt over its entire contour, close to the edges of the latter; and two current collection trolleys, one at each end of one of said plate-like members, each of which trolleys slides in contact with one of said power supply tracks.

14. The apparatus according to claim 13, wherein said two trolleys are arranged at the same end of each of said plate-like members of said conveyor belt, and said power supply tracks are therefore placed in adjacent position, close to one or the other edge of said conveyor belt, over its entire contour.

15. The apparatus according to any one of claims 4, 9, 11 and 13 further comprising, in the upstream chamber, ventilation means which operate when the temperature inside said chamber exceeds a preset maximum limit value.

16. The apparatus according to claim 5, further comprising, in the upstream chamber, ventilation means which operate when the temperature inside said chamber exceeds a preset maximum limit value and inside each of said upstream and downstream chambers, temperature sensing means, adapted to control, according to the temperature sensed in each of said chambers, the position of the air supply and air outlet directing valves, as well as the opening of said air outlets and supply inlets on the sides of said housing and, also, when a preset limit temperature value is exceeded, to actuate said ventilation means.

17. In an apparatus for obtaining continuous blocks of polyurethane foam which apparatus comprises a foaming tunnel the lower part whereof is constituted by the conveying run of an endless conveyor belt formed by a plurality of plate-like cross members connected in hinged fashion and mounted between end driving and guiding wheels at the ends of the tunnel, a web of continuous material supported by said conveyor belt; a plurality of drawing conveyors located downstream of the foaming tunnel; a collecting means for said web located downstream of the last drawing conveyor; an idle roller arrangement located downstream of the collecting means; the improvement comprising a box-like housing surrounding said conveyor belt, said housing having a bottom, vertical sides of a height such that their upper edges are flush with the surface of the conveying run of said conveyor belt over its entire length, and vertical end plates, the end plate located on the upstream side of said conveyor belt being of a height equal to that of said sides and the end plate located at the downstream side of said conveyor belt being of a height less than that of said sides, said bottom, said sides and said end plates being totally or partially made of heat insulating material and the arrangement being such that the conveyor belt is located inside said insulating housing with the upper surface of its conveying run flush with the edges of said sides and said upstream end plate; a plurality of cross separating partition means which run between the sides of said housing, being parallel to each other and perpendicular to the backs of the upper or conveying and lower of return runs of the conveyor belt, said cross partition means being capable of acting in two positions, the first of which, called open, allows air to flow through them, and the second, called closed, does not allow air to flow; during the operation of the apparatus all said cross partition means are in the open position except one, which is in the closed position, thereby obtaining the formation of two chambers, one upstream or reaction chamber and one downstream or consolidation chamber, which are variable from one type of foam to another, and the separation between the two is formed by the partition means which are closed; at a part of the apparatus downstream from the foaming tunnel, between said foaming tunnel and the first drawing conveyor, between two drawing conveyors or between the last drawing conveyor and the idle roller arrangement, means for heating the surface of the bottom of the block of foam, the surface of said surface heating means being in contact with the web of continuous material which covers the bottom of the block, which is rolled onto the collecting means located downstream from said surface heating means.

18. The apparatus according to claim 17, wherein the number of cross separating partition means is three and the number of surface heating means is at the most three.

19. The apparatus according to claim 17, wherein said cross separating partition means are constituted by: (a) two upper and lower parts formed by a rectangular metal plate or sheet, the edges whereof are bent at right angles toward the same side, forming pairs of flanges directed toward the back of the plates of the conveyor belt, the width of said flanges being relatively small in comparison with the rest of the part; (b) two fork-like section parts which are connected by welding or by screws, in the central portion of the upper and lower parts, perpendicular thereto and in a direction parallel to and opposite said flanges; (c) rectangular parts of flexible plastic material affixed to the longitudinal edges of said flanges, the function whereof is to form airtightness with the backs of the plates which constitute the upper and lower runs of the conveyor belt, which plates, in their travel, depress along their short vertical sides said rectangular parts of plastic material, which subsequently recover their position until they are again depressed by the following short side of the plate; (d) shutting means formed by two juxtaposed rectangular plates which rest on their longer sides in the channels formed by the fork-like section parts and on their shorter sides in the sides of the housing, one of said plates being fixed and the other slidable on being actuated by rod means connected thereto, in a direction perpendicular to the sides of the box-like housing, the surface of said plates being provided with equal rectangular window-like openings, in such a position that when said plates are totally parallel the openings or window of one are in register with continuous parts of the other, constituting the closed position of the cross separating means, and when the slidable plate is actuated, by the rod means, the windows of both plates are in register, constituting the open position of the cross separating means.

20. The apparatus according to claim 17, wherein said means for heating the surface of the bottom of the block of foam is constituted by a rectangular plate, the longer side whereof is equal to or slightly larger than the breadth of the block of foam, there being arranged to one side of said plate a housing in the longitudinal central portion whereof there are arranged heating means and a temperature sensing-controlling device, and in which two side longitudinal areas there are provided two cooling conduits, one inlet conduit and another outlet conduit, which are provided with orifices which communicate with the central part in which the heating means are located, there being in the inlet conduit to the cooling means an electrovalve connected to a conduit which communicates with a compressed air tank, said electrovalve being of the type which opens when there is an electric power cut.

21. The apparatus according to claim 20, wherein said heating means are constituted by infrared radiation elements uniformly distributed in the housing, radiating heat toward the back of the rectangular plate, the front side whereof is in contact with the paper web, the feeding of the radiating elements being connected and disconnected by the action of the temperature sensing-controlling device.

22. The apparatus according to claim 20, wherein said heating means are constituted by a coil located in the housing, which coil is fed by hot oil or steam, the amount of heat being controlled by the position of an electrovalve located in the inlet conduit, which is governed by the temperature sensing-controlling device located in the housing.

23. The apparatus according to claim 22 wherein the temperature sensing-controlling device also controls the opening of the electrovalve located in the inlet conduit of the cooling means.

* * * * *